(12) United States Patent
Kurz

(10) Patent No.: US 6,394,710 B1
(45) Date of Patent: May 28, 2002

(54) TOOL AND METHOD FOR PROCESSING PERFORATIONS

(75) Inventor: Artur Kurz, Wendlingen (DE)

(73) Assignee: Mapal Fabrik Fur Prazisionswerkzeuge Dr. Kress KG (DE)

(*) Notice: Subject to any disclaimer, the term of this patent is extended or adjusted under 35 U.S.C. 154(b) by 0 days.

(21) Appl. No.: 09/403,607

(22) PCT Filed: Apr. 22, 1998

(86) PCT No.: PCT/EP98/02383
§ 371 (c)(1),
(2), (4) Date: Jan. 5, 2000

(87) PCT Pub. No.: WO98/48964
PCT Pub. Date: Nov. 5, 1998

(30) Foreign Application Priority Data

Apr. 26, 1997 (DE) .......................... 197 17 835

(51) Int. Cl.[7] ..................... B23B 35/00; B23B 29/034
(52) U.S. Cl. ................ 408/1 R; 408/154; 408/159; 408/180; 408/187; 408/2; 82/1.5
(58) Field of Search .................. 408/147, 154, 408/159, 180, 187, 188, 1 R, 2; 82/1.4, 1.5

(56) References Cited

U.S. PATENT DOCUMENTS

| 2,224,386 A | | 10/1940 | Guild | |
|---|---|---|---|---|
| 2,368,846 A | | 6/1945 | Klomp | |
| 3,644,049 A | | 2/1972 | Hahn | |
| 4,451,185 A | * | 5/1984 | Yamakage | ............... 408/2 |
| 4,712,953 A | * | 12/1987 | Witzel et al. | ............ 408/16 |
| 6,013,016 A | * | 1/2000 | Irvine et al. | ............ 408/1 R |
| 6,220,798 B1 | * | 4/2001 | Kress et al. | ........... 408/147 |

FOREIGN PATENT DOCUMENTS

| DE | 3529876 | | 5/1987 | |
|---|---|---|---|---|
| DE | 4022579 A1 | * | 1/1991 | ........... 408/159 |
| DE | 4125106 A1 | * | 2/1993 | ............ 82/1.2 |

* cited by examiner

*Primary Examiner*—Steven C. Bishop
(74) *Attorney, Agent, or Firm*—Ostrolenk, Faber, Gerb & Soffen, LLP

(57) ABSTRACT

A tool having a base body is proposed, on which at least one cutter holder, preferably a rocker-type cutter holder, is mounted such that it can be adjusted transversely with respect to the axis of the tool. The cutter holder carries a cutter and rests via a pressure piece on a control chamfer, which is provided on a control sleeve which is mounted in the base body such that it can be displaced axially in relation to the pressure force. The tool is defined in that the movement of the cutter holder (35) is controlled by at least one centrifugal force-actuated element (44, 66).

56 Claims, 14 Drawing Sheets

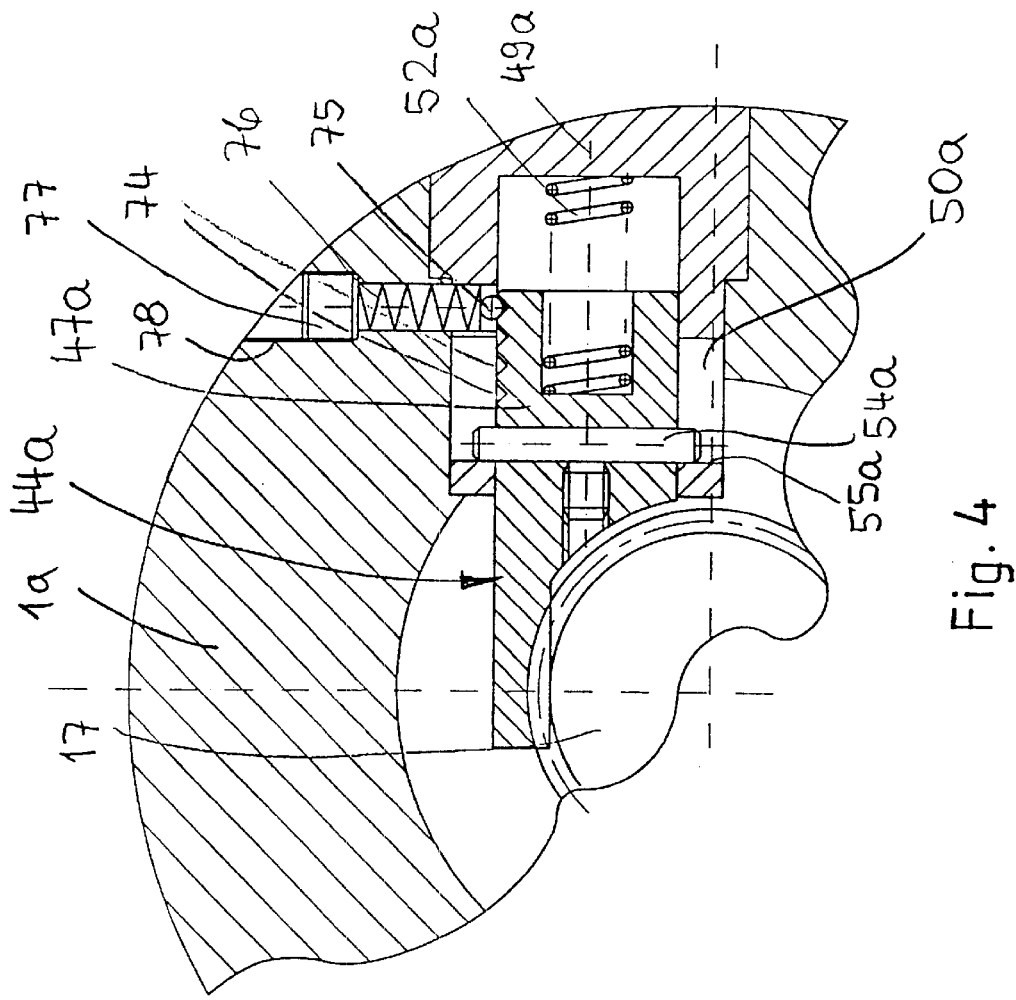
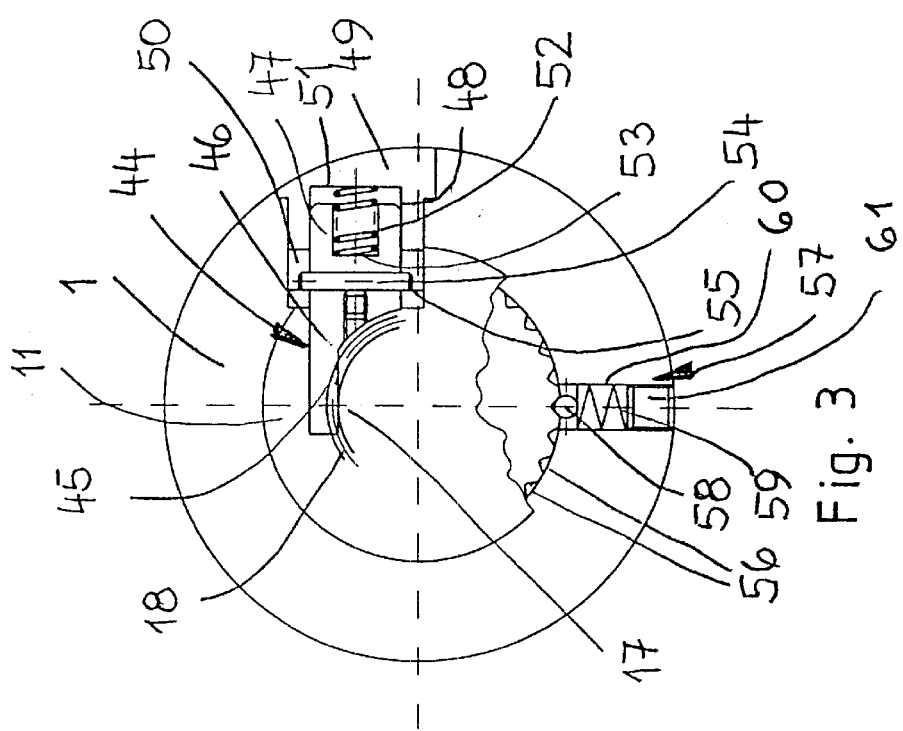
Fig. 4
Fig. 3

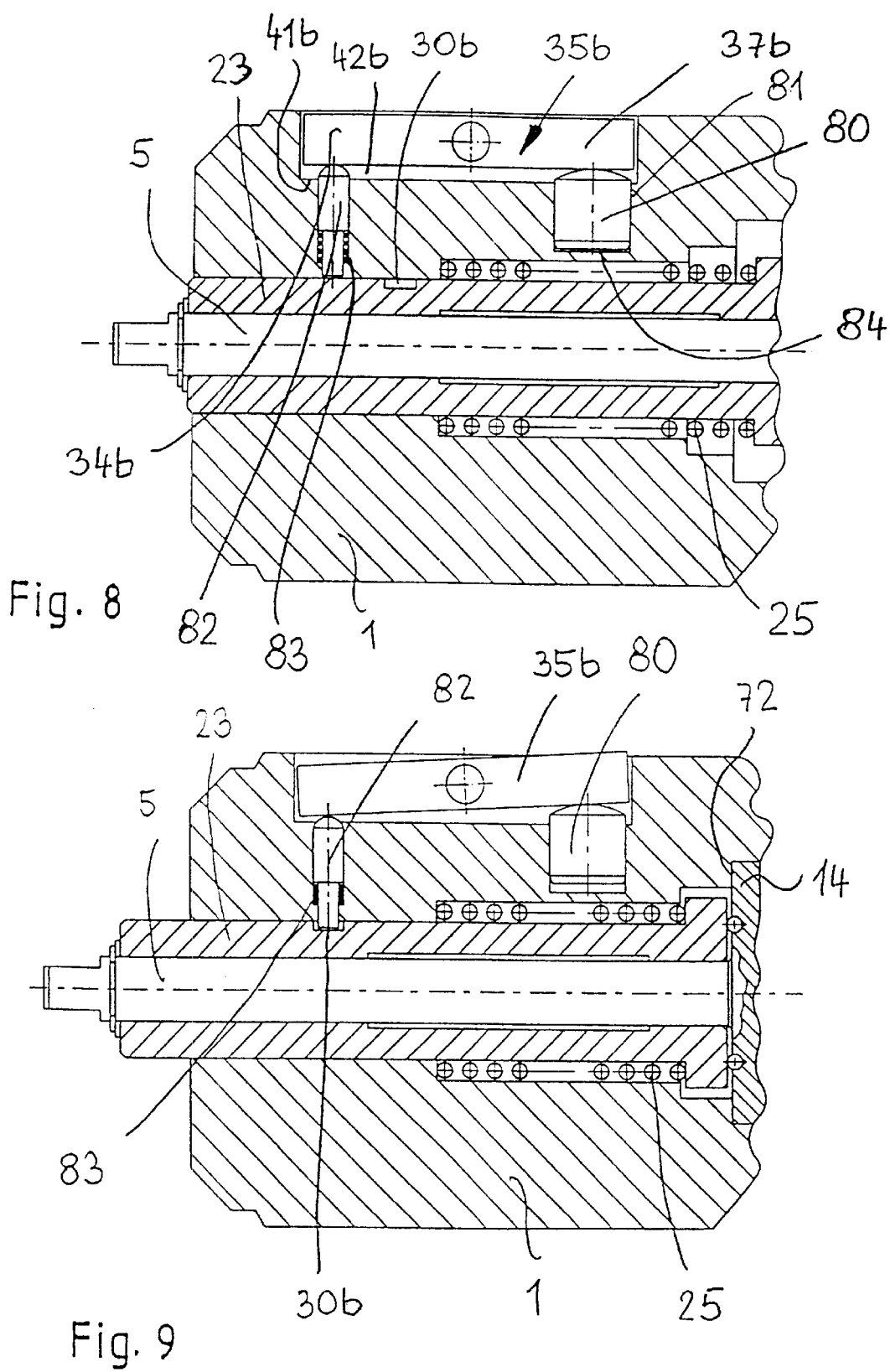

TOOL AND METHOD FOR PROCESSING PERFORATIONS

BACKGROUND OF THE INVENTION

The invention relates to a tool for the machining of bores in workpieces and to a method of machining bores with such a tool.

During about the last hundred years, production technology has been brought to its current state by intensive and worldwide development. In modern automobile plants, for example, four-cylinder mass-production engine blocks are produced with cycle times less than one minute. Machining is carried out in transfer lines. They comprise a large number of machining stations lined up in a row behind one another (turning, boring, milling machines and the like), which are permanently linked together in space and time by an automatic workpiece transport device. The work progresses under cyclic control. As soon as all the machining units have fulfilled their respective task, the workpieces are transported onward by one cycle distance to the next machining station.

This procedure permits only low flexibility, that is to say adaptability to other machining tasks. In addition, high investment costs are needed for the transfer line, for which reason such plants can be used economically only in mass production and large-scale production. Model changes, design changes resulting from technical improvements or expansions to the product range are barely possible, or possible only to a restricted extent with a high outlay, mostly only by utilizing the yearly plant holidays.

At the same time, a changing consumer behavior with more frequent model changes and, in many cases, little guaranteed statements about the product politics to be expected in the future and to be included early in the calculation plans, as well as the displacement of production, caused by cost pressures, away from the classical industrial countries demand a more flexible production method with smaller batch sizes and the lowest possible overall costs.

In principle, this problem is solved by the use of flexible production systems. They satisfy the contradictory aims of higher productivity and flexibility. A number of NC machines which supplement one another or replace one another, generally machining centers, are linked to one another by a computer-controlled workpiece transport device.

In the production of cylinder bores in engine blocks, a high quality must be achieved, that is to say it is necessary to work to very small dimensional, positional, shape and surface tolerances. The desired nominal dimension of the cylinder bore is as a rule not identical to the nominal dimension of the cutting edge on the tool, since the wear-dependent cutting force gives rise to deformations on tool and workpiece, the interface between machine and tool exhibits geometric deviations, and the accuracy of reproduction of the tool holder is limited. Since all the materials have a wearing effect to a greater or lesser extent on the cutting edge which defines the dimension, the actual diameter of the bores becomes smaller and smaller with the number of workpieces machined. Because of that, the precision boring cutter has to be readjusted very much earlier, generally for reasons concerned with statistical quality control, at the latest when the lower dimensional tolerance is reached.

For the purpose of precision adjustment and cutter wear compensation, control devices for the cutter are provided. Therefore, on the tool the setting by means of elastic deformation of simple or parallelogram bending beams or diaphragms is provided as an articulated connection between the tools or tool adapters, which can mostly be pivoted, and the machine spindle.

It is also known to perform the setting by means of linear slide guides of all types having tool holder slides which can be adjusted essentially in the radial direction, for example so-called planar rotary heads, or by means of single-armed or two-armed levers or rockers or links as cutter holders.

The elastic systems have the disadvantage of a very limited adjustment range, different control forces and therefore nonlinear influences, as well as only moderately stiff, vibration-sensitive control elements.

The control devices with slide guides take up a great deal of space with large external diameters, high weight and moment of inertia and problems in balancing. Slide, slide guide and control element must run without play or will have running play and backlash and generally also have to be clamped firmly after the control operation.

The drive to the control device is carried out by means of controlled actuation of a control rod in the drive spindle, by means of hydraulic or pneumatic control pistons, by means of internal coolant supply, hydraulic oil supply or by compressed air supply.

The object of the invention is to develop the generic tool and the generic method in such a way that the tool can be used both on standard machines and on special machines, preferably NC-controlled machines and is distinguished by a favorable price/performance ratio, by high accuracy, by stiffness and operational reliability and by a compact construction.

This object is achieved by the tool and method according to the present invention.

SUMMARY OF THE INVENTION

In the tool according to the invention, the radial adjustment of the cutter is initiated by the centrifugal force-actuated element. It is therefore possible for the cutter holder to be adjusted very simply via the rotational speed of the tool, and therefore for the cutter seated on said holder to be readjusted. The tool according to the invention is distinguished by a construction of simple design, so that it can be produced cost-effectively. It can be used both on special machines and on standard machines. For example, using the tool according to the invention, which is driven so as to rotate about its axis, housings in machine and vehicle construction, especially multicylinder engine blocks and cylinder heads for internal combustion engines, compressors, injection pumps and so on can be machined very accurately. In the method according to the invention, cylinder bores can be produced with high accuracy under track control in at least two, preferably in three, NC axes. As a result of the design according to the invention, highly accurate readjustment of the cutter is possible, this readjustment lying in the $\mu$ range. It is therefore possible to compensate for wear of the cutter simply and nevertheless highly accurately. The cutter provided on the cutter holder is advantageously a cutter for final machining, so that after the final machining, the tool has a high machining accuracy because of the design of the tool according to the invention. By arranging further cutters on the same tool body, it is also possible for additional machining operations, for example chamfering, to be carried out, or for the production operation to be divided up into coarse and fine machining.

BRIEF DESCRIPTION OF THE DRAWINGS

Further features of the invention emerge from the further claims, the description and the drawings.

The invention will be explained in more detail using some exemplary embodiments illustrated in the drawings, in which:

FIG. 3 shows a radial section in two planes of a centrifugal force element of the tool according to FIG. 1, FIG. 4 shows, in an enlarged illustration and in radial section, a second embodiment of a centrifugal force element of the tool according to the invention, FIG. 8 shows, in an enlarged illustration and in axial section, part of a control sleeve of the tool according to the invention, FIG. 9 shows, in an illustration corresponding to FIG. 8, the control sleeve in an axially displaced and locked position.

DETAILED DESCRIPTION OF THE INVENTION

Figure 10:
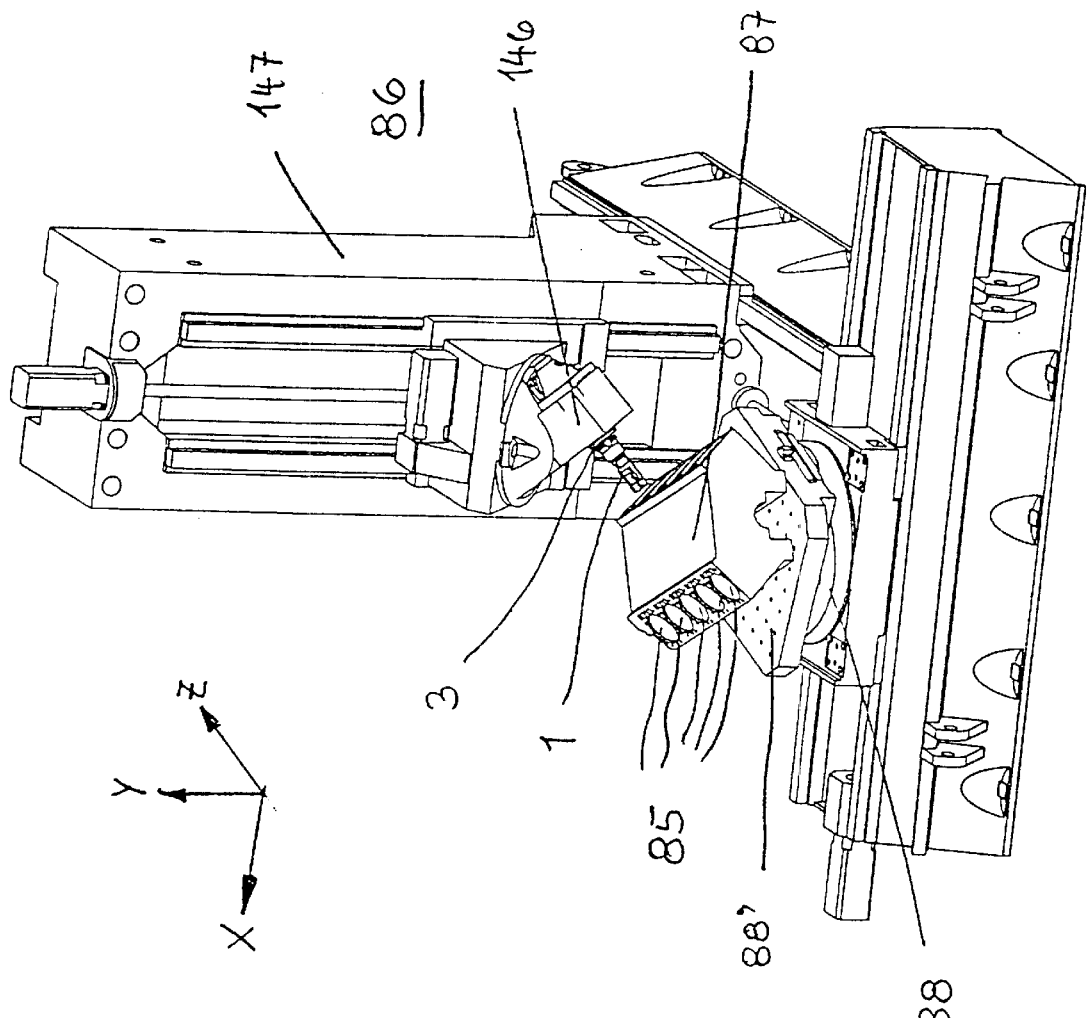
FIG. 10 shows a machining machine having tools according to the invention during the machining of an engine block.
Figure 10A:
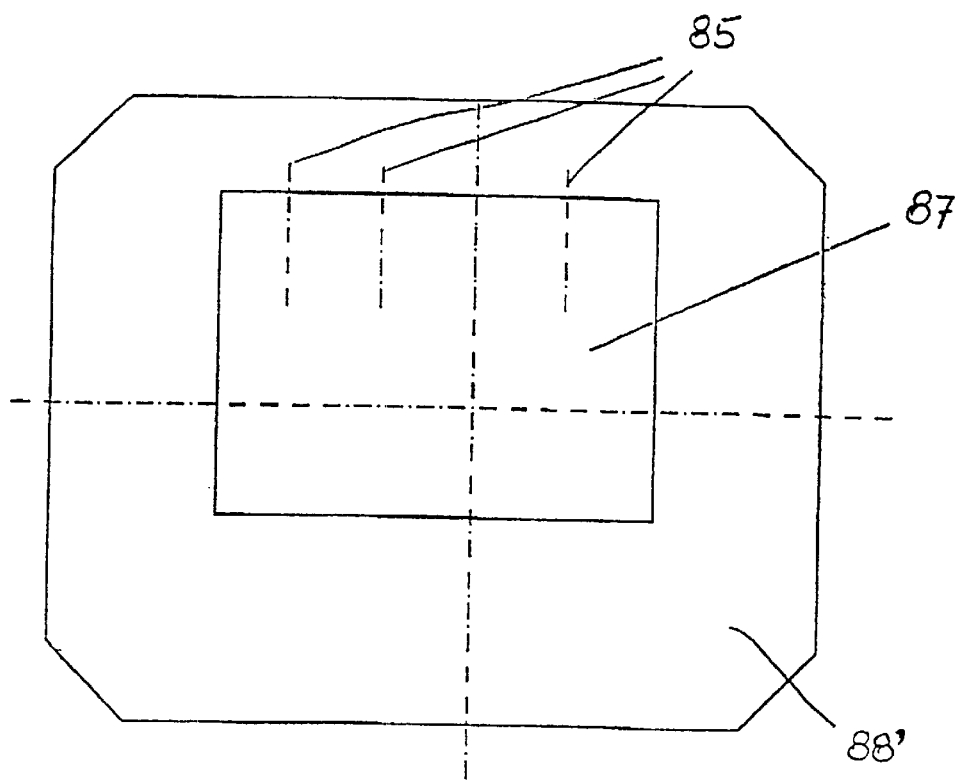
FIG. 10a shows, in a schematic illustration, a plan view of the engine block according to FIG. 10.

The tool is preferably a boring-out tool, with which cylinder bores can be machined by metal removal. The tool has a base body 1 having a connecting flange 2 at the end, by means of which the tool can be connected to a drive spindle 3 (FIG. 10). The base body 1 is penetrated axially and centrally by a bore 4, in which a control rod 5 is mounted such that it can be displaced. Said control rod is provided at one end with a piston 6, which is located in a pressure chamber 7. The latter is provided in a closure part 8, with which the bore 4 is closed at one end. The closure part 8 is detachably fastened by screws 9 to the connecting flange 2 of the base body 1. The control rod 5 projects, with sealing, through a base 10 of the closure part 8, which rests on the inner wall of an enlarged-diameter end section 11 of the bore 4.

The control rod 5 penetrates the entire length of the base body 1 and, at its end facing away from the connecting flange 2 and located outside the base body 1, has an actuating element 12 with which a cutter 13 of the tool can be adjusted radially in a manner yet to be described, in order to set said cutter and to readjust it in the event of wear or adjust it back when the end of the adjustment has been reached. The actuating element 12 can be rotated by hand or by rotating an appropriate device or by rotating a spindle in such a way that the cutter 13 is readjusted or moved radially back to the start of the adjustment range.

Seated on the control rod 5 is a spindle nut 14, which is provided on the inside with a screw thread 15. A screw thread 16 of a control spindle 17, which is seated on the control rod 5, engages in the screw thread 15. At an axial distance from the screw thread 16, the control spindle 17 is provided with peripheral toothing 18, in which, in the end position illustrated in FIG. 1, matching toothing 19 of an antirotation element 20 engages. The latter is rotationally fixedly connected to the base body 1. It rests on the inner wall of the end section 11 of the bore 4. The antirotation element 20 is advantageously detachably connected to the base body 1.

The control spindle 17 has a clearance from the control rod 5 virtually over its entire length. Only at the level of the toothing 18 does the control spindle 17 rest on the control rod 5. In the end position illustrated in FIG. 1, the control spindle 17 rests with an end face 21 on the base 10 of the closure part 8. On its side facing the control spindle 17, the base 10 is advantageously provided with a projection 22, on whose flat end the control spindle 17 rests.

On that side of the spindle nut 14 which faces away from the control spindle 17, a control sleeve 23 is seated on the control rod 5 such that it can be displaced axially together with the latter and, at its end facing the spindle nut 14, is provided with a flange 24 that is directed radially outward. With this flange, the control sleeve 23 rests on a flange of the control rod 5 under the force of at least one compression spring 25. The compression spring 25 is supported at one end on the flange 24 and at its other end on a radial base 26 of an annular depression 27 in the wall of the bore 4. In the region from the base 26 of the depression 27 as far as the end 28 of the base body 1, the control sleeve 23 rests on the wall of the bore 4. The axial displacement travel of the control rod 5 and therefore also of the control sleeve 23 is limited by at least one stop 72 (FIG. 2), which is arranged in the base body 1. A part 31 of an antirotation element 29, which engages in a groove 30 in the control sleeve 23, is advantageously formed by a roller in order to keep the friction low during the displacement of the control sleeve 23. The antirotation element 29 secures the control sleeve 23 against rotation with respect to the base body 1.

On the outside, the control sleeve 23 is provided with a control chamfer 32, which runs obliquely radially inward in the direction of the spindle nut 14 of the control rod 5. Supported on the control chamfer 32 is a pressure piece 33, which is mounted such that it can be displaced radially in the base body 1 and on which an arm 34 of a rocker 35 rests under pressure force. Said rocker is designed as a two-armed lever and is mounted in the base body 1 such that it can pivot about an axis 36 located perpendicular to the axis of the control rod 5. The other arm 37 of the rocker 35 has pressure applied to it, in the exemplary embodiment by a disk-spring pack 38. The latter is accommodated in a depression 39 in the rocker arm 37. The disk-spring pack 38 is supported on the base of the depression 39 and on a mating holder 40, which, under the force of the disk-spring pack, rests on the base 41 of a depression 42 which is provided on the periphery of the base body 1 and which accommodates the rocker 35. The pressure piece 33 advantageously rests with a ball 43 on the control chamfer 32. The readjustable cutter 13 is provided on the rocker arm 34.

In the region between the spindle nut 14 and the toothing 18 of the control spindle 17, a centrifugal force element 44 is mounted such that it can be displaced in the base body 1. When the tool is stationary, the centrifugal force element 44 is loaded radially inward under pressure force. As FIG. 3 shows, the centrifugal force element 44 has toothing 45 which can interact with the toothing 18 on the control spindle 17. The centrifugal force element 44 projects, with a part 46 having the toothing 45, into the end section 11 of the bore 4. The toothed part 46 merges into a sleeve part 47, which projects into a depression 48 of a closure part 49. Supported on the base 51 of the depression 48 of the closure part 49 is a compression spring 52, with which the centrifugal force element 44 is loaded radially inward. The compression spring 52 is additionally supported on the base 53 of the centrifugal force element 44. As long as the tool is not rotating, the centrifugal force element 44 is loaded radially inward by the force of the compression spring 52, until it rests with a stop 54, preferably a transverse pin penetrating the centrifugal force element, on the base 55 of a groove 50 in the closure part 49. The toothed part 45 of the centrifugal force element 44 projects through the base 55 of the groove 50.

Figure 1:
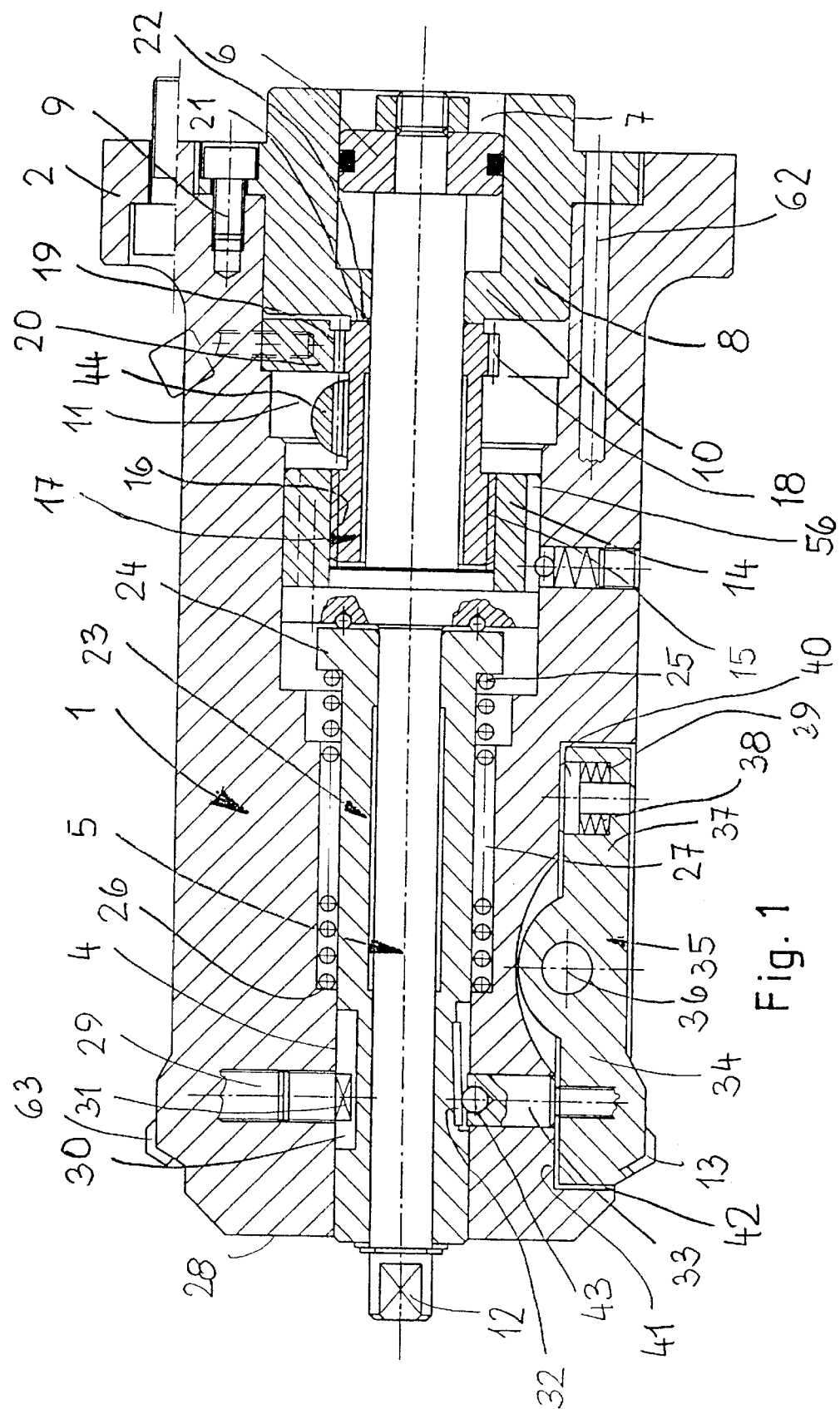
FIG. 1 shows an axial section of a tool according to the invention, whose readjustable finishing cutter assumes its final position, in which it is located at the end of its readjustment range.

On the outside, the spindle nut 14 is provided with latching depressions 56 (FIG. 3), which are advantageously provided uniformly distributed over the periphery of the spindle nut 14 and extend over the axial length of the spindle nut (FIG. 1). The latching depressions 56 are part of an antirotation means 57, with which undesired rotation of the spindle nut 14 and therefore of the control rod 5 is prevented. A latching element 58, which is advantageously formed as a ball, engages in one of the latching depressions 56 and is preferably under the force of at least one compression spring 59. The latter is accommodated in a radial bore 60 in the base body 1, said bore being closed by a threaded pin 61, on which the compression spring 59 is supported.

Figure 6:
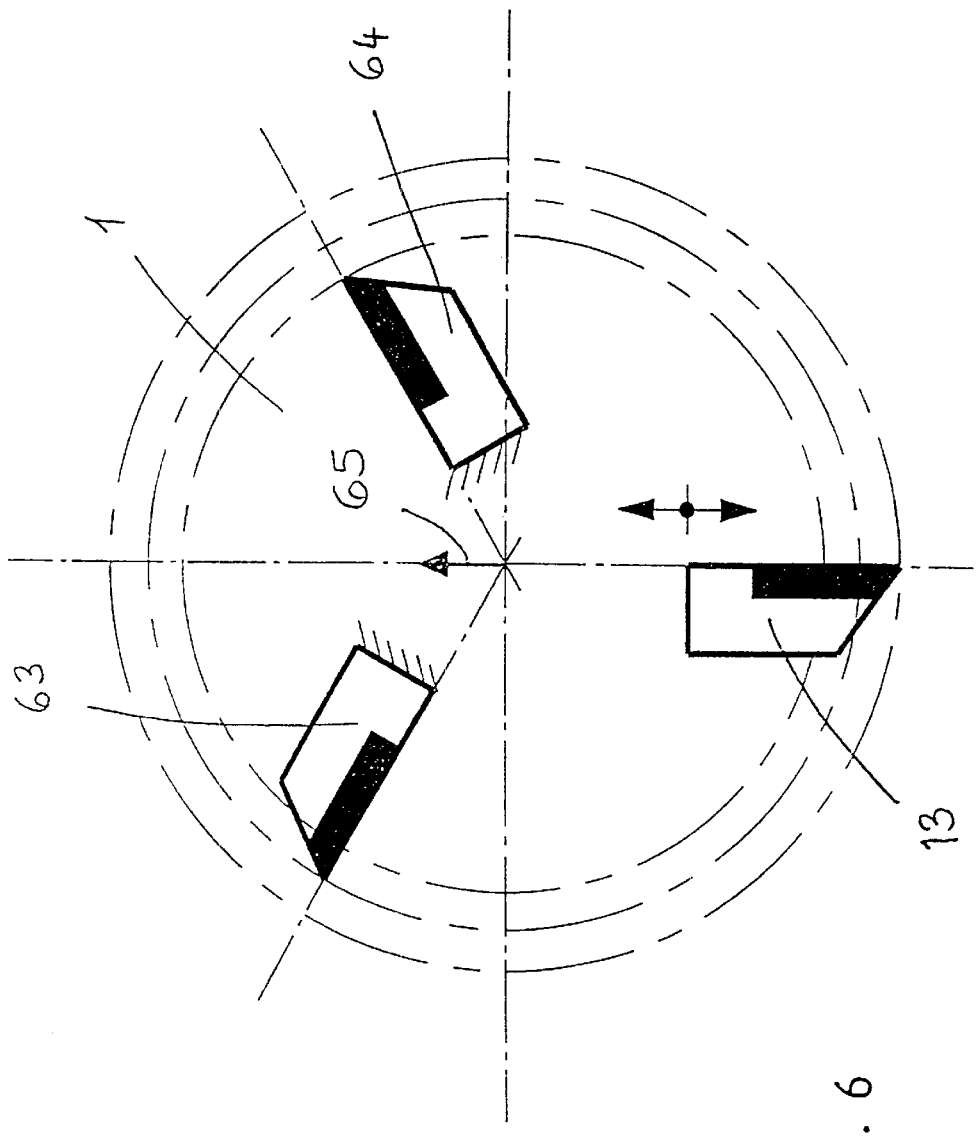
FIG. 6 shows, in a schematic illustration, and in an axial view, the cutters of the tool according to FIG. 1.

In the following text, a machine having only one NC axis (Z axis) is designated a special machine. The tool according to FIG. 1 is provided for special machines and is connected to the drive spindle by its connecting flange 2 (FIG. 1). In the illustration according to FIG. 1, the cutter 13 is in the machining position at the end of the readjustment range, that is to say it is advanced radially to the maximum. The toothing 18 of the control spindle 17 is engaged with the antirotation element 20. The control sleeve 23 rests with its flange 24, under the force of the compression spring 25, on the spindle nut 14 of the control rod 5. During metal-removal machining, the tool rotates at the speed $n_{work}$. As a result, a centrifugal force acts on the centrifugal force element 44 and leads to the centrifugal force element 44 coming to rest, counter to the force of the compression spring 52, until it rests on the base 51 of the depression 48. This radial displacement of the centrifugal force element 44 has no influence on the control spindle 17, since the centrifugal force element 44, as FIG. 1 shows, is located in a tooth-free region of the control spindle 14 between the spindle nut 14 and the toothing 18. During the metal-removal machining, coolant flows into the working region of the tool through a coolant bore 62 in the base body The tool has, for example, three cutters (FIG. 6) of which the cutter 13 provided on the rocker 35 can be readjusted radially. The two other cutters 63 and 64 are fixed rigidly to the base body 1. The fixed cutters 63, 64 are provided for the semifinished cut, while the cutter 13 is used for the final cutting. The three cutters 13, 63, 64 are arranged at angular intervals of, for example, 120° from one another. In addition, the cutters are provided offset axially with respect to one another. The cutters have different working diameters, which are indicated in FIG. 6 by dashed lines. The cutter 64 has the smallest working diameter. The cutter 63 which follows in the axial direction has a greater working diameter. The readjustable cutter 13, which is arranged offset axially in relation to the cutter 63, finally has the greatest working diameter. It is used to produce the finished bore. In order that the tool can be moved out of the machined workpiece bore following the final machining, the tool is moved in the direction of arrow 65 in FIG. 6, using the machine axis, to such an extent that all three cutters 13, 63, 64 have a clearance from the wall of the bore. The tool can then be moved axially out of the bore without contact.

During the machining operation, wear occurs on the cutter 13, which leads to a reduction in the finished diameter of the bore. For this reason, the cutter 13 is readjusted, depending on its wear, such that the desired finished diameter of the bore is achieved. In order to readjust the cutter 13, the drive spindle and therefore the tool are stopped. Since centrifugal force then no longer acts on the centrifugal force element 44, the latter is shifted radially inward by the compression spring 52 (FIG. 3) into the position illustrated in FIG. 3.

Figure 2:
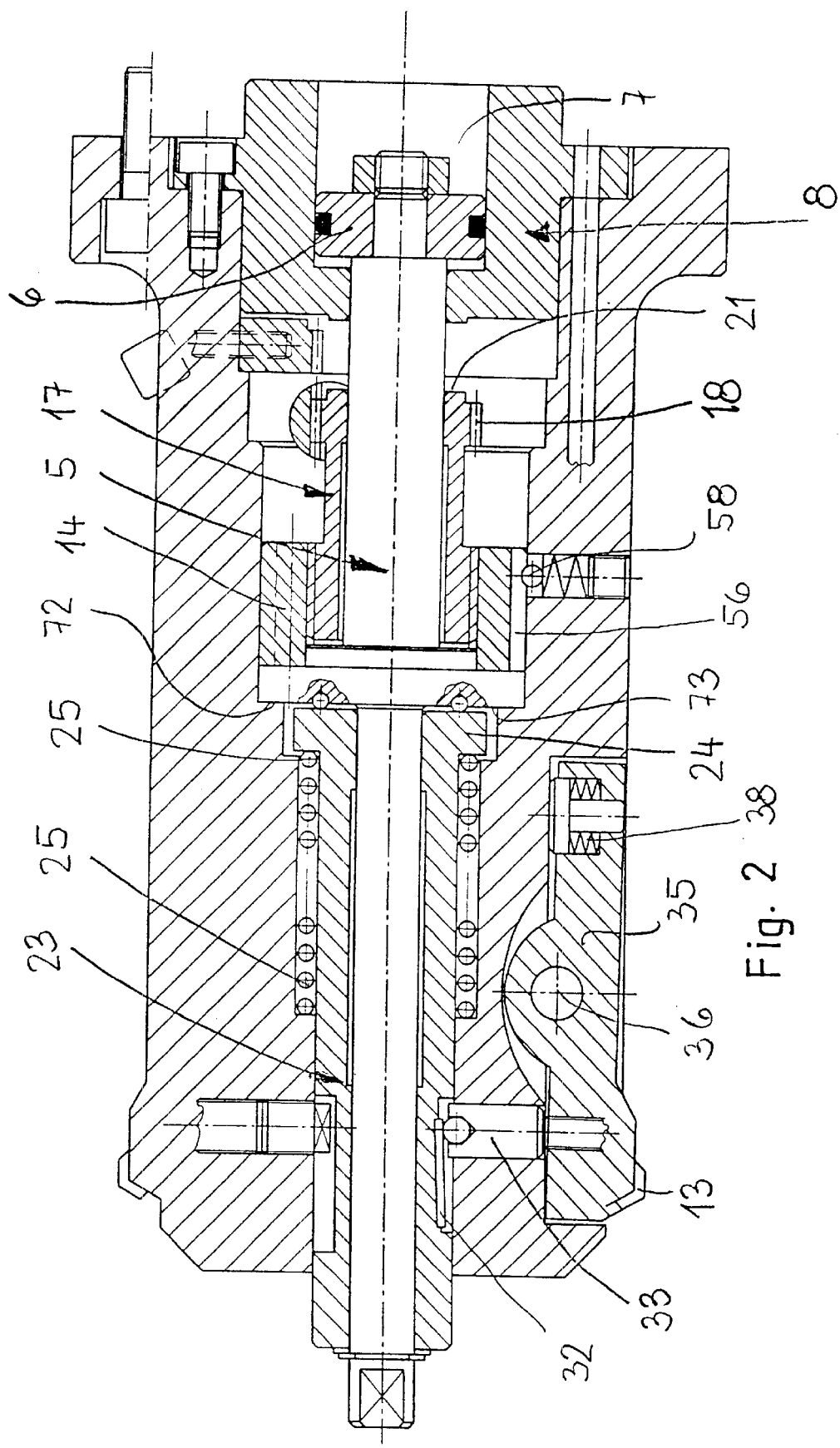
FIG. 2 shows the tool according to FIG. 1, whose finishing cutter has been lifted off the wall of the bore.

The piston 6 seated on the control rod 5 has pressure applied to it via a separate pressure medium, as a result of which the control rod 5 is displaced axially counter to the force of the compression spring 25 (FIG. 2). The displacement travel of the control rod 5 is bounded by an annular shoulder face 72 which projects radially inward and on which the spindle nut 14 of the control rod 5 comes to rest with its underside 73. Since the control spindle 17 seated on the control rod 5 has its screw thread 16 engaged with the screw thread 15 of the spindle nut 14, the control spindle 17 is carried along during this displacement movement of the control rod 5. In the process, the latching element 58 slides in the corresponding latching depression 56 on the outside of the spindle nut 14. During the displacement of the control spindle 17, its toothing 18 comes into engagement with the toothing 45 on the centrifugal force element 44.

As soon as the position according to FIG. 2 has been reached, the drive spindle and therefore the tool are set rotating. The rotational speed n, is less than or equal to the speed $n_{work}$ during the machining of the workpiece. Because of the engagement of the centrifugal force element 44 in the control spindle 17, during this radial displacement of the centrifugal force element 44, the control spindle 17 is rotated about its axis. Since the screw thread 16 of the control spindle 17 is engaged with the screw thread 15 of the spindle nut 14, during the rotation of the control spindle 17 the relative position between it and the control rod 5 changes. The result of this is that the distance between that end 21 of the control spindle 17 which faces the piston 6, and the control chamfer 32 changes. Since the cutter 13 is to be readjusted as a result of wear, this distance is reduced. Because of the axial displacement of the control rod 5 and therefore of the control sleeve 23, the pressure piece 33 rests on a point on the control chamfer 32 which is located radially relatively far in (FIG. 2). The cutter 13 is therefore arranged relatively far radially inward.

After this centrifugal force-controlled, automatic adjustment of the cutter 13 and the rocker 35, the supply of pressure medium into the pressure chamber 7 is terminated, and the drive spindle is then stopped, so that the tool no longer rotates. Under the force of the compression spring 25, the control sleeve 23 is shifted back and, via its flange 24, takes the control rod 5 with it. Since the control spindle 17 is connected via the screw threads 15, 16 to the spindle nut 14 of the control rod 5, the control spindle 17 is likewise shifted back axially without changing the relative position between it and the control rod 5. The toothing 18 on the control spindle 17 then comes into engagement again with the mating toothing 19 on the antirotation element 20 (FIG. 1). The control rod 5 is shifted back until the end 21 of the control spindle 17 strikes the projection 22 on the closure part 8. In the process, the rocker 35 is pivoted in the counterclockwise direction about the axis 36 by the pressure piece 33. Because of the above-described reduction in distance between the end 21 of the control spindle 17 and the control chamfer 32, the cutter 13 is set to a greater diameter, and therefore the cutting wear which has occurred is compensated for.

The mating holder 40 (FIG. 1) on which the disk-spring pack 38 is supported is advantageously detachably fixed to the base 41 of the depression 42 in which the rocker 35 is accommodated. During its pivoting movement, the rocker 35 thus moves in relation to the mating holder 40. The disk-spring pack 38 ensures that the pressure piece 33 always rests with adequate force on the control chamfer 32, even when the cutter 13 is not engaged with the workpiece to be machined.

The readjustment range of the cutter 13 may be several tenths of a millimeter. The centrifugal force-controlled readjustment of the cutter 13 is so fine that readjustment steps of 1 $\mu$ are possible.

A relief bore (not illustrated) opens into the pressure chamber 7 and ensures that when the control rod 5 is shifted back, the pressure medium in the pressure chamber can be expelled again by the piston 6. During the readjustment of the cutter 13, this relief bore is closed, so that the necessary pressure for displacing the control rod 5 can build up in the pressure chamber 7. During the metal-removal machining, that is to say at the rotational speed $n_{work}$ of the tool, the relief bore is opened.

In order to readjust the cutter 13, the centrifugal force 44 is in each case displaced until its sleeve part 47 comes to rest on the base 51 of the depression 48 (FIG. 3). This adjustment travel is selected such that the control spindle 17 can be rotated onward precisely by one tooth of its toothing 18. This rotary travel corresponds to a predefined readjustment travel of the cutter 13.

In the exemplary embodiment according to FIGS. 1 to 3, in each case only one readjustment step is possible for each radial displacement of the centrifugal force element 44. It is of course possible to construct the tool in such a way that the cutter 13 can be readjusted to a different extent. For this purpose, the tool is rotated at different adjustment speeds, so that the centrifugal force element 44 is adjusted outward to a different radial extent, depending on the rotational speed. The result is different amounts of rotary travel of the adjusting spindle 17 and thus different amounts of readjustment travel of the cutter 13. FIG. 4 shows such an exemplary embodiment.

The sleeve part 47*a* of the centrifugal force element 44*a* is provided on the outside with latching depressions 74, into which a latching element 75, preferably a latching ball, latches under pressure force, preferably under the force of at least one compression spring 76. The number of latching depressions 74 determines the number of possible readjustment steps for the cutter 13. FIG. 4 shows the initial position of the centrifugal force element 44*a*, in which the latching element 75 engages in the latching depression 74 which is furthest removed radially from the control spindle 17. If, after pressure has been applied to the control rod 5 in the above-described manner, the tool is rotated at a speed which is lower than the machining speed $n_{work}$, the centrifugal force element 44 is shifted radially outward, counter to the force of the compression spring 52*a*, until the latching element 75 latches into the next latching depression 74. In this way, the displacement travel of the centrifugal force element 44*a* can be set differently by graduating the respective speeds.

As in the case of the previous example, when the tool is stationary, the stop 54*a* rests on the base 55*a* of the depression 50*a* in the closure part 49*a*. The compression spring 76 loading the latching element 75 is supported on a threaded pin 77, which is screwed into a threaded hole 78 in the base body 1*a*. Otherwise, the tool according to FIG. 4 is of identical design to the previous embodiment. The readjustment of the cutter 13 is also done in the same way, apart from the above-described differences, as in the previous exemplary embodiment.

Figure 5:
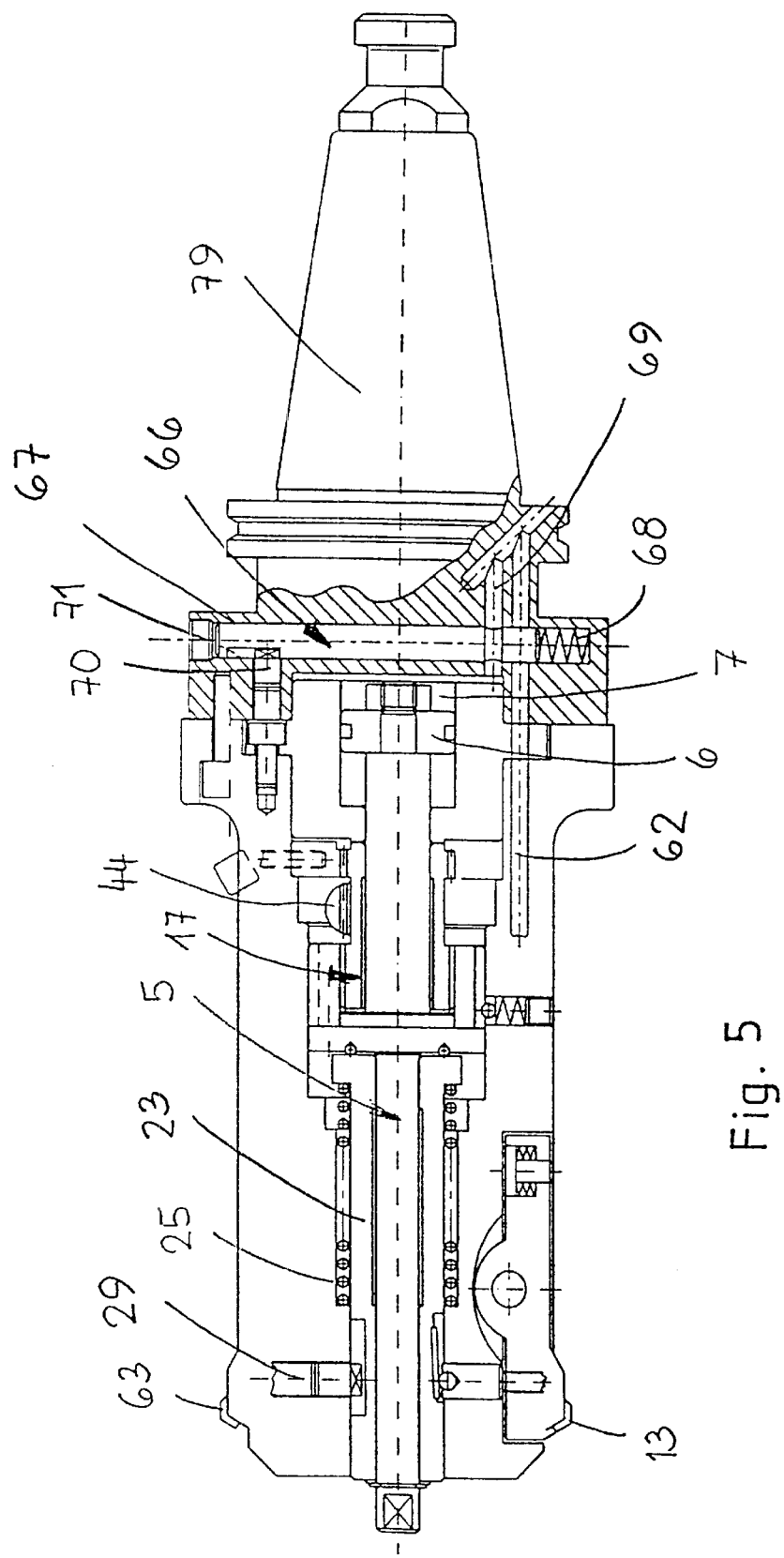
FIG. 5 shows an axial section of a second embodiment of a tool according to the invention.
Figure 7:
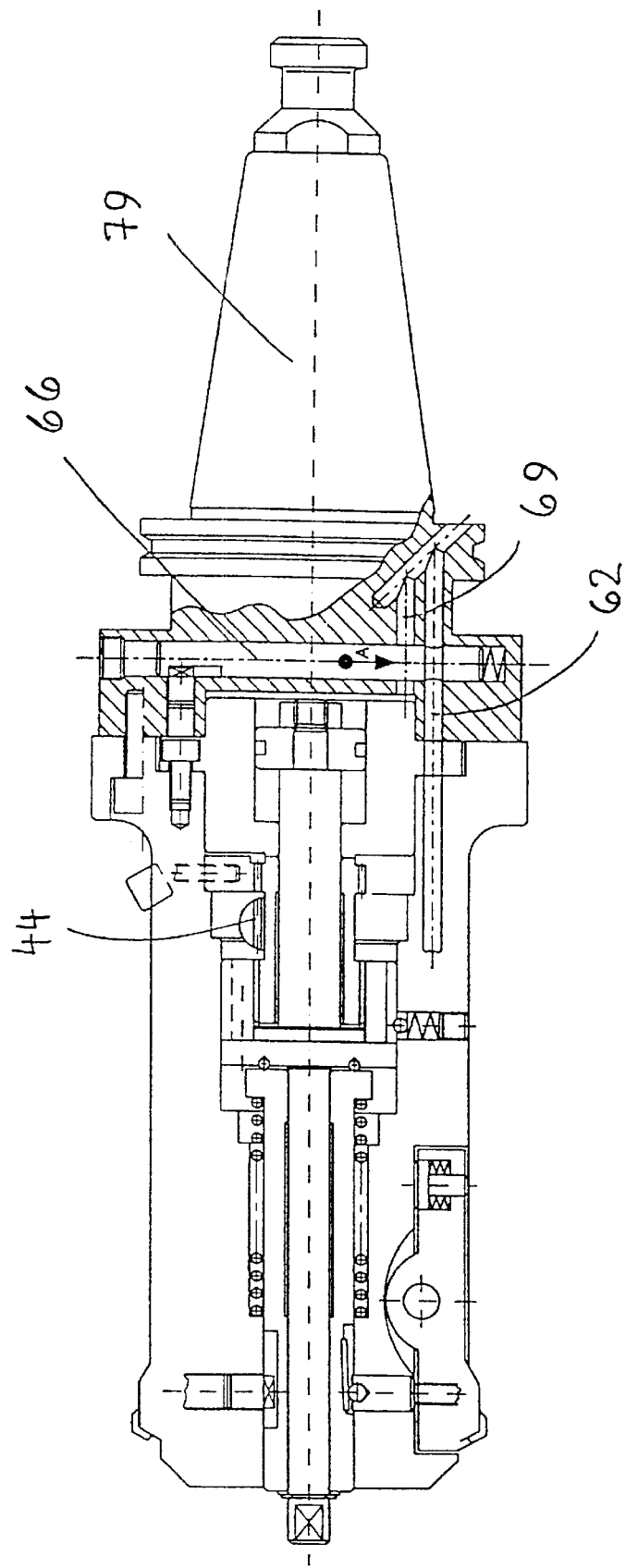
FIG. 7 shows an axial section of the tool according to FIG. 5 during the machining operation.

The tool according to FIGS. 5 and 7 is provided with a clamping cone 79, with which it can be connected to the drive spindle 3 of a machining center having automatic tool changing. The clamping cone 79 can be a steep-angle cone, a hollow-shank cone or the like. In the exemplary embodiment according to FIGS. 1 to 3, the tool does not have such a clamping cone. Therefore, as a result of the lack of a clamping cone 79, the tool according to FIGS. 1 to 3 is preferably provided for special machines, in which the tool is fastened directly to the drive spindle via the connecting flange 2.

As distinct from the embodiment according to FIGS. 1 to 3, the tool according to FIGS. 5 and 7 has the second centrifugal force element 66 in the form of a slide, which is accommodated such that it can be displaced counter to the force of at least one compression spring 68 in a transverse bore 67 in the tool. The transverse bore 67 is located perpendicular to the axis of the tool. The slide 66 is used to open and close the coolant bore 62 and a pressure medium bore 69 alternately. The slide 66 is designed in such a way that, during the machining of the workpiece, it is displaced under centrifugal force, counter to the force of the compression spring 68. The pressure medium bore 69 is then closed by the slide 66 (FIG. 7), while the coolant bore 62 is open. When the tool is at a standstill, the slide 66 is then displaced by the compression spring 68 into the position illustrated in FIG. 5, in which the coolant bore 62 is closed and the pressure medium bore 69 is open. The displacement travel of the slide 66 is limited by a stop 70, which is preferably designed in the same way as the stop 29 with which the displacement travel of the control sleeve 23 is limited. The stop 70 engages in a groove 71 running in the axial direction in the slide 66. During the processing of a workpiece, the slide 66 assumes the position illustrated in FIG. 7. As soon as the tool is stopped, the slide 66 is displaced by the compression spring 68 into the position illustrated in FIG. 5. The pressure medium, preferably the coolant, is then led into the pressure chamber 7 via the pressure medium bore 69.

The piston 6 seated on the control rod 5 accordingly has pressure applied to it, as a result of which the control rod 5 is displaced axially counter to the force of the compression spring 25. As has been explained with reference to FIGS. 1 to 3, following the application of pressure, the tool is rotatably driven at the speed $n_1$, by which means the centrifugal force-controlled readjustment of the cutter 13 is effected. The speed $n_1$ is selected such that only the centrifugal force element 44 is displaced radially outward under the action of centrifugal force and counter to the force of the compression spring 52 (FIG. 3). The speed $n_1$ relating to the relative adjustment between control spindle 17 and control rod 5 is designed to be so small or the slide 66 is designed such that the centrifugal force occurring at this low speed $n_1$ of the tool is not sufficient to displace the slide 66 out of the position according to FIG. 5. Only at the working speed $n_{work}$ is the centrifugal force sufficient to displace the slide 66 from the position according to FIG. 5 into the position which is illustrated in FIG. 7 and in which it closes the pressure medium bore 69 and opens the coolant bore 62. During the readjustment of the cutter 13, the relief bore opening into the pressure chamber 7 is closed by the slide 66, so that the required pressure for displacing the control rod 5 can build up in the pressure chamber 7. During the metal-removal machining, that is to say at the speed $n_{work}$ of the workpiece, the slide 66 is displaced radially by centrifugal force in such a way that the relief bore is opened.

The slide 66 is designed such that it is displaced in the direction of arrow A in FIG. 7 at a speed $n_3$ of the tool. This speed $n_3$ is less than or equal to the working speed $n_{work}$ of the tool. The speed $n_3$ is in turn greater than the speed $n_1$ at which the centrifugal force element 44 is displaced radially outward in the manner described.

In the embodiment according to FIGS. 5 and 7, too, the centrifugal force element 44 can be designed to correspond to the embodiment according to FIG. 4. It is then also possible in the tool according to FIGS. 5 and 7 for the centrifugal force element 44 to be adjusted in stages, so that a number of readjustment steps for the cutter 13 are possible. The rotational speeds required in each case for this are lower than the speed $n_3$ for adjusting the slider 66 and lower than the working speed $n_{work}$. The following condition therefore applies with regard to the different rotational speeds: $n_1 < n_3 < n_{work}$.

The tools described can be used in an extremely wide range of machines. An additional axis is not required in order to readjust the cutter 13. Therefore, the tools described can be used, for example, on machining centers in which an additional coaxial axis is not present or, for example, is not possible because of a tool insertion device. Since the control rod 5 is provided with the actuating element 12 at its end located outside the tool, the tools can also be used in those machines which do not have a pressure medium supply. In this case, the readjustment of the cutter 13 is effected step by step by a driver device, provided on a device or on the machine, for the actuating element 12, with specific rotation of the control rod 5. In the case of this type of readjustment, the tool is stationary, so that the control spindle 17 is engaged with the antirotation element 20. If the control rod 5 is rotated about its axis by hand, the control spindle 17 remains stationary. The control rod 5 and the control spindle 17 are displaced axially relative to each other via the interengaging screw threads 15, 16, that is to say the distance between the end 21 of the control spindle 17 and the control chamfer 32 is changed. The same conditions are then present as those following the application of pressure to the piston 6 and following the rotation of the control spindle 17 by the centrifugal force element 44.

The above-described tools according to FIGS. 1 to 7 can be used, for example, in a two-stage process. During the downward stroke, semifinished machining is performed on the workpiece by the stationary cutters 63, 64 (FIG. 6) provided on the tool. During the return stroke of the tool, precision machining is performed on the workpiece by the adjustable cutter 13. During the downward stroke for the semifinished machining, the pressure chamber 17 is pressurized, so that the control rod 5 is moved up to the stop in the above-described way (FIG. 2). The control chamfer 32 is then located in a position relative to the pressure piece 33 such that the cutter 13 is adjusted radially inward to the greatest extent. It is then lifted off the wall of the bore in every case.

Once the workpiece bore has been semifinished using the stationary cutters 63, 64, the pressure chamber 7 is relieved of load, so that the control rod 5 is shifted back out of the position according to FIG. 2 into the position according to FIG. 1 under the force of the compression spring 25. The rocker 35 is then pivoted in the counterclockwise direction by the control chamfer 32 and the pressure piece 33, as a result of which the cutter 13 is adjusted radially outward. During the return stroke of the tool from out of the bore, the necessary precision machining on the wall of the bore can be performed by the cutter 13. FIG. 6 shows that, during the precision or smooth machining, only the cutter 13 is in engagement with the wall of the bore. The two other stationary cutters 63, 64 have a clearance from the wall of the bore, since their working diameters are smaller than the working diameter of the readjustable cutter 13.

In order to be able to move the tool out of the bore without grooves being formed, it can also be moved specifically in the direction of the radial plane going through the cutter 13 to such an extent in the direction of arrow 65 that the cutter 13 comes free of the wall of the bore, but the two other cutters 63, 64 still have a clearance from the wall of the bore. The tool can then be withdrawn simply and reliably from the workpiece bore without grooving. This withdrawal of the tool in the direction of arrow 65 is possible in machining centers having a number of orthogonal axes. In special machines having only one axis, this withdrawal method cannot be carried out.

In order nevertheless to permit groove-free withdrawal of the tool in such special machines, after the smooth machining by means of the cutter 13 has been completed, the piston 6 of the control rod 2 has pressure applied to it via the central pressure medium supply. Said control rod is then displaced axially in the manner described until the spindle nut 14 rests with its underside 73 on the shoulder face 72 of the base body 1 (FIG. 2). As a result, the control chamfer 32 comes into such a position that the rocker 35 can pivot in the clockwise direction. As a result, the cutter 13 is adjusted radially inward, so that it comes free of the wall of the bore. The disk-spring pack 38 ensures that the pressure piece 33 rests firmly on the control chamfer 32. Since the cutter 13 is set back in this way, the tool can be withdrawn from the workpiece bore without grooves being formed even with a special machine having only one axis. In contrast to the readjustment of the cutter 13, during this operation of withdrawing the cutter 13, the tool does not have to be stopped. The two stationary cutters 63, 64 are in any case not in engagement with the wall of the bore during the precision or smooth machining of the workpiece.

FIGS. 8 and 9 show a further embodiment of a tool which can be used on machining centers. Using this tool, semifinished machining on the downward stroke and final/finish machining on the return stroke are possible. The tool has the control rod 5, on which the control sleeve 23 is seated. It is of essentially the same design as in the exemplary embodiment according to FIGS. 1 to 3. A rocker 35b is designed as a two-armed lever. A centrifugal force element 80, which is mounted such that it can be displaced in a blind hole 81 in the base body 1, engages on the rocker arm 37b. The blind hole 81 runs radially and opens into the depression 42b accommodating the rocker 35b. The centrifugal force element 80 is of pin-like design and rests with a rounded head on that side of the rocker arm 37b which faces the base 41b of the depression 42b.

On the other rocker arm 34b, on the side facing the base 41b of the depression 42b, there engages a locking element 82, which is loaded in the direction of the rocker 35b by at least one compression spring 83. The locking element 83 rests with a rounded head on the rocker arm 34b. In the position illustrated in FIG. 8, the locking element 82 rests with the other end on the control sleeve 23. In this position, the centrifugal force element 80 rests on the base 84 of the blind hole 81.

In the position according to FIG. 8, the adjustable cutter provided on the rocker 35 (FIG. 1) is adjusted radially outward. If the tool is rotated at the speed $n_{work}$, a centrifugal force which acts outwardly acts on the centrifugal force element 80 and attempts to pivot the rocker 35b in the counterclockwise direction in the illustration according to FIG. 8. However, this is prevented by the locking element 82, which is supported on the control sleeve 23.

In order to carry out semifinished machining, the control rod 5 has pressure applied to it in the above-described manner via the piston (not illustrated). The control rod 5 is then displaced until the spindle nut 14 comes to rest on the shoulder face 72 of the base body 1 (FIG. 9). A groove 30b on the control sleeve 23 is then located at the level of the locking element 82. As the pressure is applied to the control rod 5, the tool is rotated at a speed $n_2$. This speed is selected such that the centrifugal force element 80 is moved outward. Since the locking element 82 is located at the level of the groove 30b, the rocker 35b can be pivoted in the counterclockwise direction. The force of the compression spring 83 is selected such that it is lower than the pressure force exerted on the rocker 35b by the centrifugal force element 80 at the speed $n_2$. As a result, the locking element 82 is displaced counter to the force of the compression spring 83 into the locking position illustrated in FIG. 9, in which the locking element 82 engages in the groove 30b. As a result, the locking sleeve 23 is locked axially, so that it cannot be shifted back axially under the force of the compression spring 25.

The readjustable finishing cutter is therefore also lifted off the wall of the bore without pressure being supplied, so that the semifinished machining on the workpiece can be performed during the downward stroke, using the stationary cutters of the tool. As soon as the semifinished machining has been completed, that is to say the tool is located in the bore, the drive spindle is stopped, so that the control rod 5 also stops. Since centrifugal force then no longer acts on the centrifugal force element 80, the locking element 82 can pivot the rocker 35b back in the clockwise direction with the aid of the compression spring 83, until the centrifugal force element 80 rests on the base 84 of the blind hole 81 (FIG. 8). The control sleeve 23 and therefore the control rod 5 are unlocked in this way, so that after the pressure in the pressure chamber 7 has dissipated (FIG. 1), the control sleeve 23 shifts the control rod 5 back via the spindle nut 14 under the force of the compression spring 25 (FIG. 8). The finishing machining can now be performed at the working speed $n_{work}$ during the return of the tool.

Figure 10B:
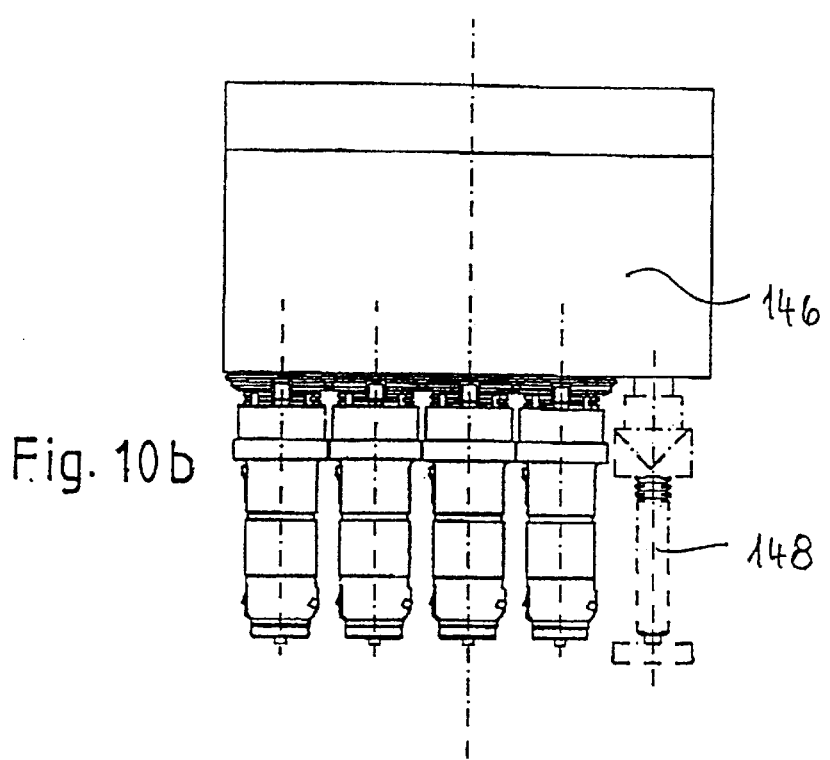
FIG. 10b shows a view of a multispindle boring cartridge of the machining machine according to FIG. 10.

FIG. 10 shows, by way of example, the machining of cylinder bores 85 on a machining center 86. The cylinder bores 85 are provided in an engine block 87, which is clamped in a known way on a pallet 88', which is mounted on a rotary table 88. The cylinder bores 85 are located on mutually opposite sides of the engine block 87, in each case alongside one another at a small distance. The different cylinder bores 85 can be machined one after another using only one tool. Because of the above-described readjustment of the cutter 13, the tool needs only a little space, so that it is also possible for a number of tools to be arranged alongside one another at a small distance (FIG. 10b). This makes it possible to perform multispindle machining of the cylinder bores 85. In conventional tools, which need an additional axis or an eccentric spindle in order to compensate for the cutter wear, the tools can only be arranged alongside one another at a relatively large distance. It is therefore not possible to machine cylinder bores arranged close alongside one another using a number of tools at the same time. In the tools described, such additional axes or eccentric spindles for readjusting the cutter 13 are not provided. This means that the tools are of very compact design, so that they can be arranged at such small distances alongside one another that cylinder bores 85 located alongside one another can be machined simultaneously. The tools are provided alongside one another on a multispindle boring cartridge 146, which can be moved in the y-direction along an upright 147 of the machining machine 86. The upright 86 [sic] can be moved in the z-direction, while the rotary table 88 carrying the engine block 87 can be moved in the x-direction.

Furthermore, the various tools provided on the boring cartridge 146 can be readjusted, controlled by measurements, independently of one another. Each tool is provided with its own pressure medium supply, so that each individual tool can be readjusted, controlled by measurement, in the above-described manner. The necessary pressure is applied only to that tool whose cutter is to be readjusted. The drilling cartridge 146 can optionally be provided with a separate measuring device 148 (FIG. 10b), with which the cylinder bore 85 can be measured following machining.

Instead of a readjustable cutter 13 and a number of fixed cutters 63, 64, a number of readjustable cutters can also be arranged on the tools described. They can be arranged distributed on the periphery and also axially one behind another.

In automatic operation, the cutting setting can be adjusted in a positive and in a negative direction by means of centrifugal force pressure-medium control. If the wear of the cutter 13 is to be compensated for, an adjustment in the positive direction is carried out, that is to say the rocker 35, 35b is pivoted in such a way that the cutter 13 is adjusted outward in accordance with the cutter wear.

Once the possible readjustment range has been reached, the rocker 35 is then pivoted back again until it reaches the initial position (FIG. 2). An adjustment in the negative direction is necessary for this setting-back operation. This setting-back operation can be carried out in one or more steps, for example in sample borings or monitoring cuts, when the diameter of the bore turns out to be greater than predefined.

The respective adjustment direction is reached through the actuating sequence of the rotary drive and the pressure medium. If, firstly, pressure is applied to the piston 6 of the control rod 5, and therefore the control rod 5 is displaced axially in the manner described, and if the tool is subsequently rotated, the cutter 13 is readjusted by the centrifugal force element 44 in the manner described such that wear on said cutter is compensated for. An adjustment in the positive direction is also carried out when the application of pressure to the piston 6 is terminated first and the tool is then stopped.

If, conversely, the tool is first driven in rotation and then pressure is applied to the piston 6 with the tool rotating, only the control rod 5 with the control spindle 17 and the control sleeve 23 is displaced axially. In the process, the control chamfer 32 is displaced relative to the pressure piece 33 to such an extent that the rocker 35 can pivot in the appropriate direction in order to set the cutter 13 back. This adjustment in the negative direction is also achieved if the tool is stopped first and the application of pressure to the piston 6 is then terminated.

Figure 11:
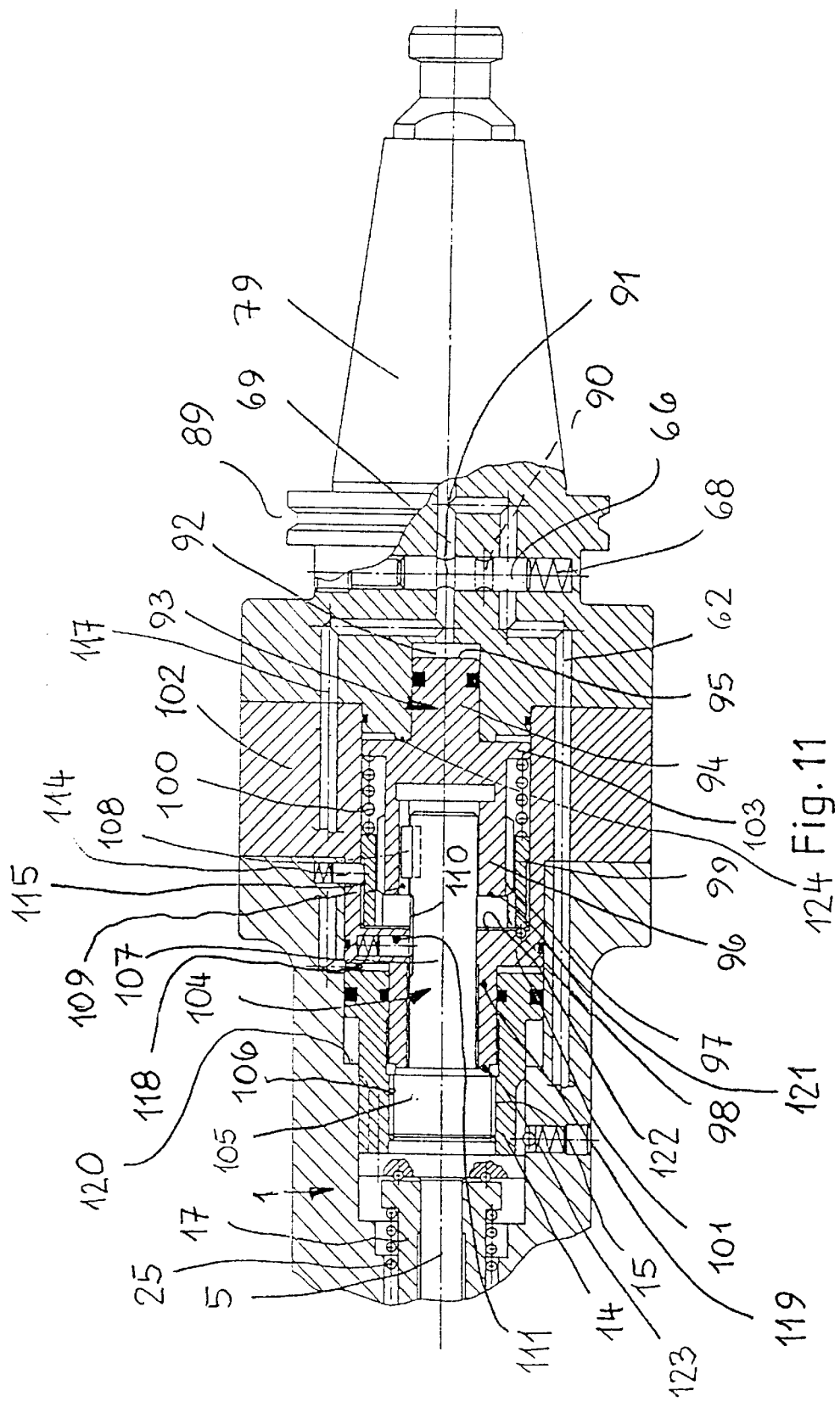
FIG. 11 shows an axial section of a further embodiment of a tool according to the invention.
Figure 12:
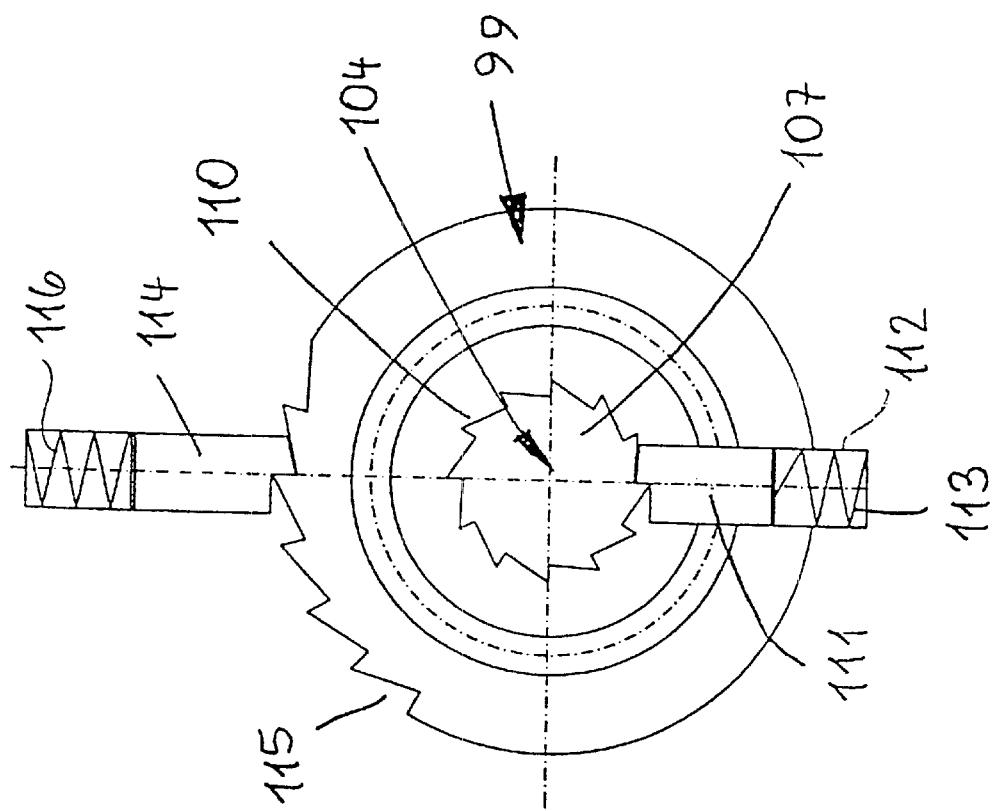
FIG. 12 shows an axial view of an adjusting device of the tool according to FIG. 11.

FIGS. 11 and 12 show a tool in which the cutter can be adjusted via two different fluidic pressure stages, without a directly acting centrifugal force element. In the exemplary embodiment illustrated, the tool is provided with the clamping cone 79, so that this tool—just like the tools according to FIGS. 5 and 7—can be changed automatically. To this end, a gripper groove 89 is provided on the clamping cone 79. The tool can also be designed to correspond to the embodiment according to FIGS. 1 to 3, and can have a connecting flange with which it is fixed directly to the drive spindle. The tool has the slide 66, with which the coolant bore 62 and the pressure medium bore 69 can be opened alternately. For this purpose, the slide 66 is provided with corresponding radial bores 90 and 91. The pressure medium bore 69 opens into a pressure chamber 92, which is bounded by an adjusting element 93. The latter has an extension 94 which acts as a piston and whose flat end 95 bounds the pressure chamber 92. The piston 94 projects axially from a sleeve part 96 which is provided with an outer part 97 of a transmission thread. The latter engages in an inner part 98 of the transmission thread. The inner part 98 is provided on a ratchet wheel 99, which is of bush-like design and rests on the base 122 of an intermediate housing part 102 under the force of a compression spring 100. The adjusting element 93 has a flange 103 which is directed radially outward and which rests on the inner wall of the intermediate housing part 102. Supported on the flange 103 is the compression spring 100, which surrounds the sleeve part 96 of the adjusting element 93 with a clearance.

A threaded spindle 104, which has an enlarged-diameter end section 105 whose periphery is provided with a screw thread 106, projects into the sleeve part 96 of the adjusting element 93. Said screw thread 106 is engaged with the screw thread 15 of the spindle nut 14, which is permanently connected to the control rod 5. The control spindle 17 is seated on the latter. Since the part of the tool which is on the left in FIG. 11 is of identical design as that in the embodiment according to FIGS. 1 to 3, this part of the tool is not illustrated in FIG. 11, for clarity.

The threaded spindle 104 has a cylindrical extension 107 which projects axially from the end section 105 and is provided close to its free end with at least one driver 108, which projects radially beyond the extension 107 and engages in a depression 109 running axially in the inner wall of the sleeve part 96. In this way, the adjusting element 93 and the threaded spindle 104 are positively connected to each other in the direction of rotation. In the axial direction, relative displacement between the adjusting element 93 and the threaded spindle 104 is possible.

In the region outside the driver 108, the extension 107 of the threaded spindle 104 is provided with latching toothing 110, which is designed as ratchet toothing and in which a latching pin 11 engages under spring force. The latching pin 111 is mounted in a radial bore 112 (FIG. 12) in the base body 1 or its intermediate housing part 102, and is loaded in the direction of its latching position by a compression spring 113. Because of the ratchet toothing 110, the threaded spindle 104 can be rotated only in one direction, while in the opposite direction rotation is prevented by the latching pin 111.

A further latching pin 114 is mounted such that it can be displaced radially in the base element 1, and engages in latching toothing 115 on the periphery of the ratchet wheel 99. The latching toothing 115 is likewise designed as ratchet toothing, so that the ratchet wheel 99 can be rotated only in one direction. In the other direction, the latching pin 114 prevents the rotation of the ratchet wheel 99. As FIG. 12 shows, the two sets of latching toothing 110 and 115 are provided in such a way that, in the illustration according to FIG. 12, the threaded spindle 104 can be rotated in the clockwise direction and the ratchet wheel 99 can be rotated in the counterclockwise direction. The latching pin 114 is subject to the force of a compression spring 116 (FIG. 12), which loads the latching pin 114 in the direction of its latching position.

From the pressure medium bore 69, which opens into the pressure chamber 92, there branches off a pressure medium bore 117 (FIG. 11), which opens into a pressure chamber 118 which is bounded by the spindle nut 14 of the control rod 5. The intermediate housing part 102 has a sleeve part 119, on which the spindle nut 14 is displaceably guided in a sealed manner. In addition, the spindle nut 14 rests in a sealed manner on the inner wall of the housing part 1. The displacement travel of the spindle nut 14 is limited by a peripheral shoulder face 120 projecting radially inward on the inner wall of the base body 1. The spindle nut 14 comes to rest on said shoulder face during the adjustment operation which is yet to be described. The threaded spindle 104 projects through the sleeve part 119 of the intermediate housing part 102. The end section 105 of the threaded spindle 104 is located in the region outside the sleeve part 119. As FIG. 11 shows, the end section 105 of the threaded spindle 104 projects into the spindle nut 14. In the initial position according to FIG. 11, the pressure chamber 118, which is located between the spindle nut 14 and the intermediate housing part 102, has its smallest volume.

If, following the machining of the workpiece bore, the tool is to be moved back out of the bore without return grooves, the cutter 13 is set back radially (FIG. 1). To this end, a switch is made to a lower pressure stage, that is to say the pressure medium is supplied via the pressure medium bore 69 at an appropriately low pressure. Here, the slide 66 is in the position illustrated in FIG. 11, in which the coolant bore 62 is closed and the pressure medium bore 69 is opened. The pressure medium flows into the pressure chamber 118 via the pressure medium bore 117. As a result, the control rod 5, together with the spindle nut 14 permanently connected to it, is displaced counter to the force of the compression spring 25 until the spindle nut 14 comes to rest on the shoulder face 120. As a result of the displacement of the control rod 5, the control chamfer 32 comes into the position, illustrated in FIG. 2, relative to the pressure piece 33, as a result of which the cutter 33 is moved radially inward under the force of the disk-spring pack 38 and, as a result, is lifted off the wall of the bore. The pressure medium is supplied at a pressure such that the adjusting element 93 is not displaced.

If the cutter 13 is to be readjusted because of wear, the pressure of the pressure medium is increased to a second stage. As a result of the higher pressure, the adjusting element 93 is displaced counter to the force of the compression spring 100, until it comes to rest with the end 121 of its sleeve part 96 on a radially inwardly directed wall 122 of the intermediate housing part 102. During the displacement, the adjusting element 93 is rotated about its axis, since its outer part 97 engages in the inner part 98 of the ratchet wheel 99. The two threaded parts 97, 98 are each designed as transmission threads, in particular as steep-angle threads. The ratchet wheel 99 itself is blocked against rotation in the opposite direction by the latching pin 114. As the adjusting element 93 is rotated, the threaded spindle 104 is rotated by one step by the driver 108. The latching pin 111 allows the threaded spindle 104 to rotate in this direction of rotation (FIG. 12). As a result, the threaded spindle 104 is rotated onward by one tooth of the latching toothing 110. This rotary step is defined by the pitch of the internal thread 98 on the ratchet wheel 99 and by the original distance between the end 121 of the adjusting element 93 and the wall 122 of the intermediate housing part 102. In this direction of rotation, the threaded spindle 104 is not blocked, since the latching toothing 110 is of opposite design, in comparison with the latching toothing 115 on the ratchet wheel 99. As a result, the latching pin 111 ratchets over the teeth of the latching toothing 110. During this rotation, the threaded spindle 104 is screwed into the spindle nut 14. As has been explained with reference to the previous exemplary embodiments, as a result the distance between the control chamfer 32 (FIG. 1) and the stop 123 fixed to the housing is changed. Said stop is formed by the end of the sleeve part 119 of the intermediate housing part 102.

After the threaded spindle 104 has been rotated, the pressure under which the pressure medium has been placed is reduced to the first stage. The compression spring 100 is designed such that its force is then greater than the hydraulic force acting on the end 95 of the adjusting element 93. As a result, the adjusting element 93 is moved back again into the position illustrated in FIG. 11, in which the adjusting element 93 rests with its flange 103 on the stop 124 fixed to the housing. Since the adjusting element 93 and the ratchet wheel 99 are interengaged via the screw threads 97, 98, the ratchet wheel 99 is rotated by one step as the adjusting element 93 is shifted back. In FIG. 12, the rotation of the ratchet wheel 99 therefore takes place in the counterclockwise direction. In this case, the latching pin 114 ratchets over the corresponding tooth of the latching toothing 115. The latching pin 114 now prevents the threaded spindle 104 being rotated in the counterclockwise direction (corresponding to FIG. 12).

As soon as the adjusting element 93 comes to rest on the stop 124, the application of pressure by the pressure medium is switched off, so that the pressure chamber 118 becomes depressurized. The compression spring 25 is then able to shift the spindle nut 14, and therefore the control rod 5, back until the end section 105 of the threaded spindle 104 comes to rest on the stop 123 fixed to the housing. Since, as has been explained with reference to the previous exemplary embodiments, the distance between the control chamfer 32 and the stop 123 fixed to the housing has been reduced by the adjustment, as the control rod 5 is shifted back by the pressure piece 33 (FIG. 1), the rocker 35 is pivoted in such a way that the cutter 13 is adjusted radially outward. This adjustment step is sufficiently large for the wear of the cutter 13 to be compensated for.

If the cutter 13 is to be adjusted by a number of steps, the higher pressure stage is used repeatedly, so that the threaded spindle 104 is rotated by a number of steps.

After the cutter 13 has been readjusted and the pressure has been switched off, the tool is rotated at the working speed $n_{work}$. The slide 66 is again designed and arranged in such a way that it is displaced by the centrifugal force which is produced thereby, counter to the force of the compression spring 68. As a result, the pressure medium bore 69 is closed and the coolant bore 62 is opened. The coolant, which has previously been used as the pressure medium, is consequently diverted into the cutting region of the tool.

Instead of the ratchet toothing systems 110, 115 described, it is also possible to permit the respective rotation in only one direction by means of a freewheel clutch.

Figure 13:
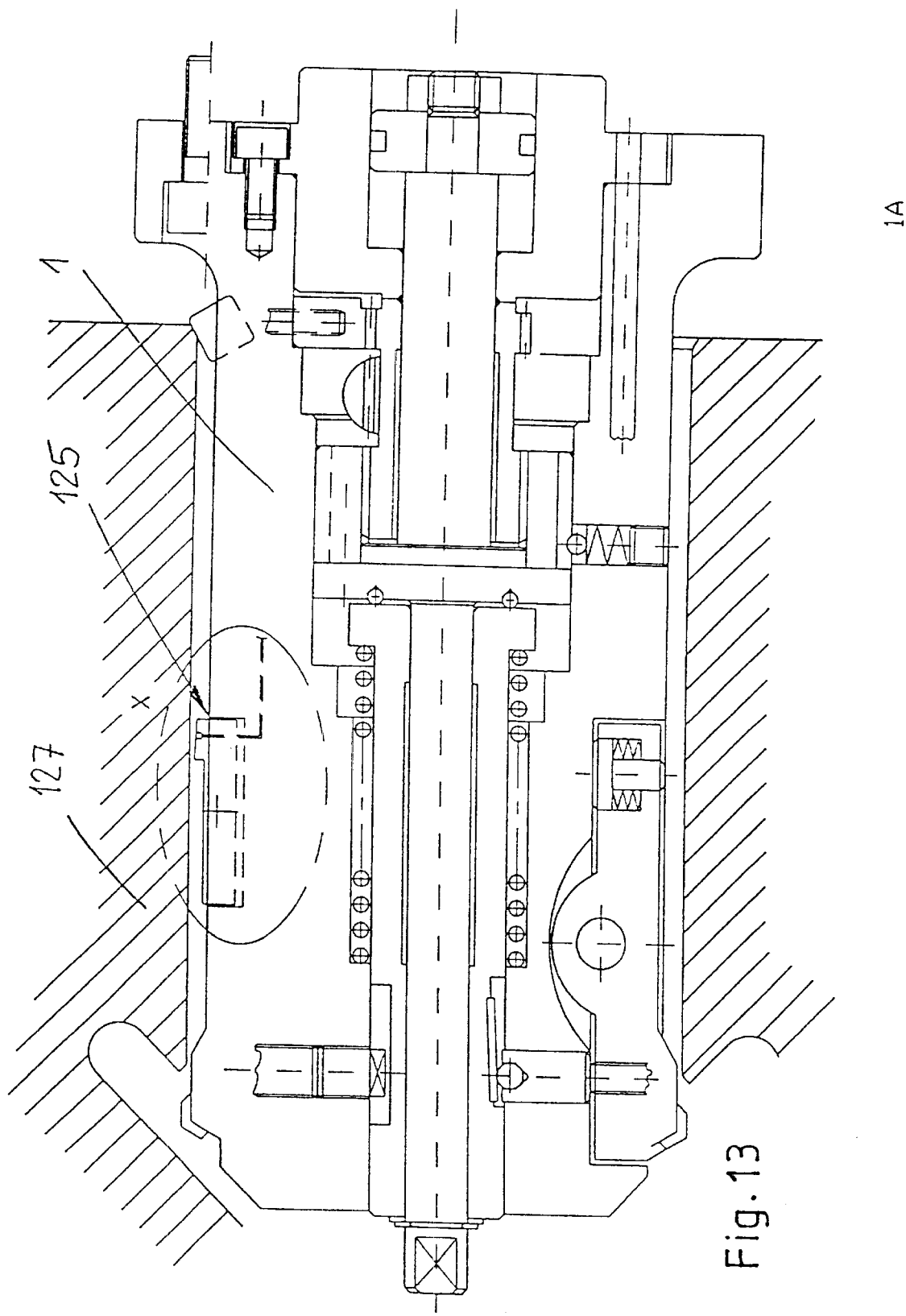
FIG. 13 shows an axial section of a further embodiment of a tool according to the invention.
Figure 14:
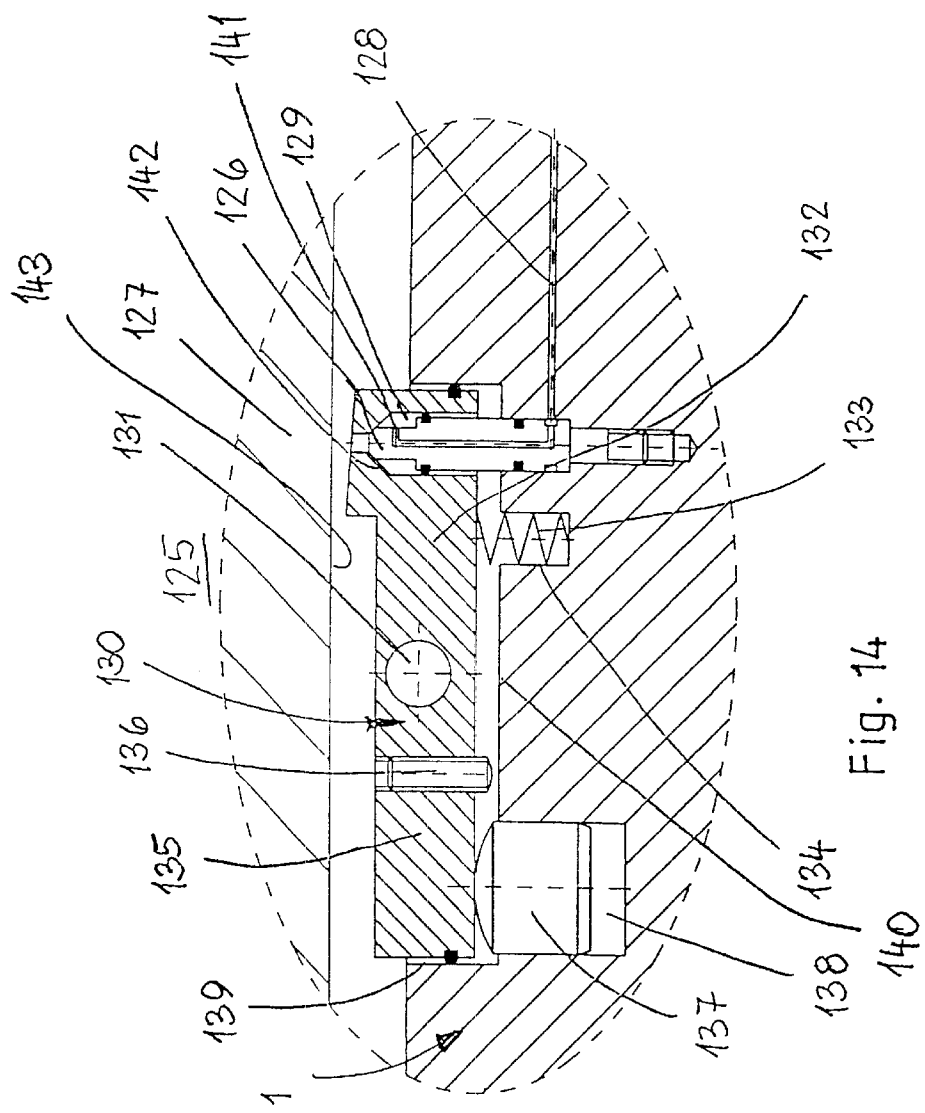
FIG. 14 shows, in an enlarged illustration and in section, the tool according to FIG. 13 during the machining of the bore in a workpiece.
Figure 15:
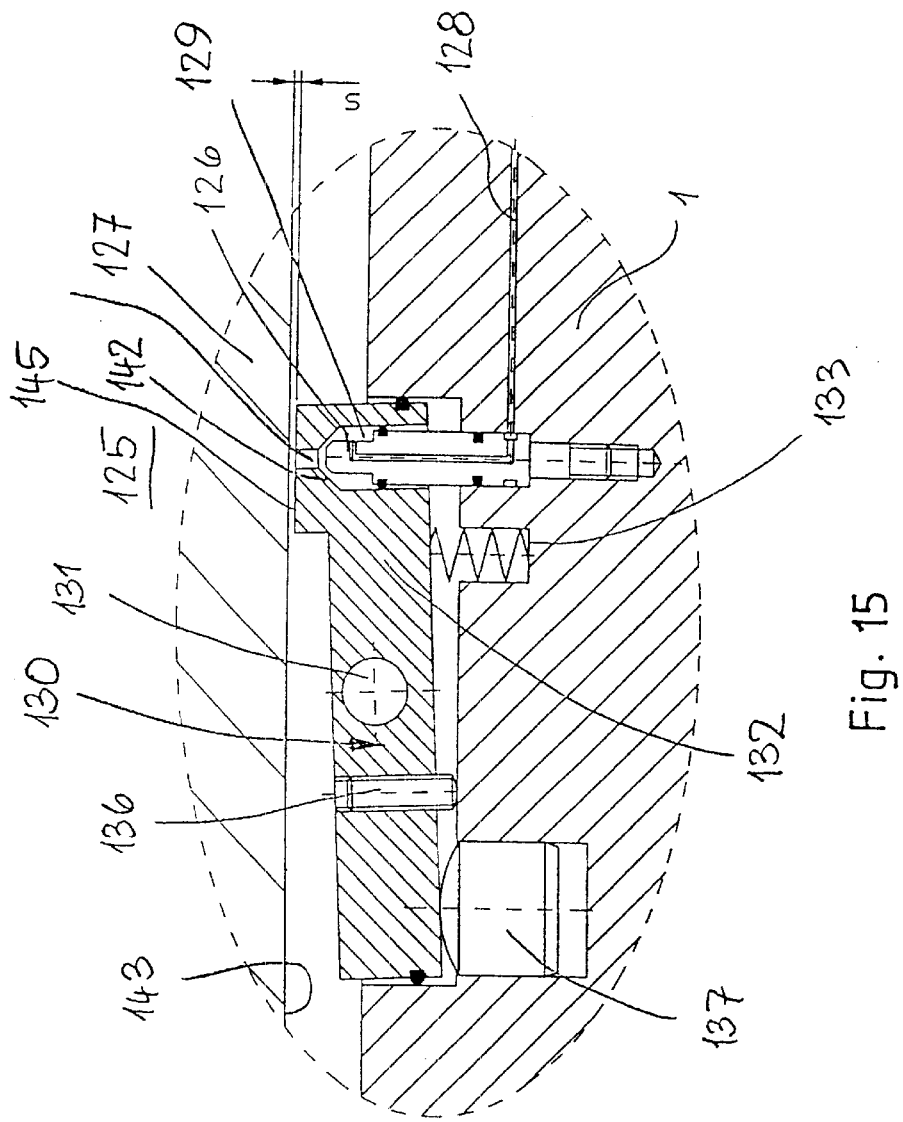
FIG. 15 shows, in an illustration corresponding to FIG. 14, the tool with the spindle stationary and during the measuring operation.

FIGS. 13 to 15 show a tool which is provided with integrated air measuring nozzles, so that the precise diameter of the bore can be measured very easily. These air measuring nozzles operate so accurately that a measurement of the diameter in the $\mu$ range is possible. Since the air measuring nozzles are integrated into the tool, a separate measuring mandrel is not necessary, so that the idle times during the use of the tool are shortened. In addition, a significantly more precise measurement results than when using a separate measuring mandrel, since the air measuring nozzles are arranged directly on the machining tool and positioning errors are therefore avoided.

The tool according to FIGS. 13 to 15 can have an embodiment corresponding to FIGS. 1 to 12. In the exemplary embodiment illustrated, the tool corresponds to the embodiment according to FIGS. 1 to 3, apart from the differences to be described.

The measuring device 125, which works on the compressed air principle, is arranged on the base body 1 of the tool. During the metal-removal machining, the measuring device 125 is uncoupled and, as FIG. 14 shows, is arranged so that a measuring nozzle 126 of the measuring device 125 cannot come into contact with the wall of the bore of the workpiece 127 to be machined. The measuring nozzle 126 is arranged to be stationary on the base body 1 of the tool. A compressed air line 128, which is connected to a compressed air source, opens into said measuring nozzle. The measuring nozzle 126 projects into a mounting space 129 on a two-armed rocker 130. It can be pivoted about an axis 131 which is located perpendicular to the axis of the tool and is provided close to the periphery of the base body 1. Supported on the arm 132 which has the mounting space 129 is a compression spring 133, which is provided in a depression 134 in the outside of the base body 1. The other rocker arm 135 has a setting screw 136, which is designed as a threaded pin and with which the pivoting travel of the rocker 130 for the measuring operation can be set. In the region of its free end, the rocker arm 135 rests on a centrifugal force element 137, which is mounted such that it can be displaced radially in a depression 138 in the outside of the base body 1. The rocker 130 projects partly into a depression which is provided on the outside of the base body 1 and into whose base 140 the depressions 134 and 138 open.

During the machining of the workpiece 127, the tool rotates at the speed $n_{work}$. The centrifugal force element 137 is designed in such a way and arranged on the base body 1 in such a way that it moves radially outward under centrifugal force and, in so doing, pivots the rocker 130 counter to the force of the compression spring 133 (FIG. 14). The outlet opening 141 is located on the side of the measuring nozzle 126. During the machining of the workpiece, the base 142 of the mounting space 129 is located above the periphery of the measuring nozzle 126, on the end region of the latter. As a result, the nozzle outlet opening 141 is closed, so that dirt arising during the machining of the workpiece does not pass into the nozzle outlet opening 141 and block the latter. No measurement takes place during the machining of the workpiece. The rocker 130 is located at a sufficient distance from the wall 143 of the bore, so that damage by the rocker is avoided.

After the machining of the workpiece, the drive spindle and therefore the tool is stopped. Since centrifugal force no longer acts on the centrifugal force element 137, the rocker 130 is pivoted into the position illustrated in FIG. 15 under the force of the compression spring 133. The pivoting angle is determined by the distance by which the setting screw 136 projects beyond the rocker 130. The setting screw 136 comes to rest on the base 140 of the depression 139 and thereby terminates the pivoting movement of the rocker 130. Because of the pivoting movement of the rocker 130, the base 142 of the mounting space 129 is lifted off the measuring nozzle 126. The compressed air is therefore able to flow out of the outlet opening 141 of the measuring nozzle 126 to an outlet opening 144 in the rocker arm 132 which is directed toward the wall 143 of the bore. In the region of the measuring nozzle 126, the rocker arm 132 is of thickened design. The end 145 of the rocker arm 132 which is directed toward the wall 143 of the bore forms a measuring face which is opposite the wall 143 of the bore with a measuring gap s (FIG. 15). The size of this measuring gap s can be set finely and continuously by the setting screw 136. The finished bore is therefore measured by the compressed air. The evaluation of the measurement result is known per se and will therefore not be explained specifically.

On the machine side, the compressed air is connected in a manner known per se to the stationary tool following the machining of the workpiece 127. One measuring nozzle 126 is sufficient to measure the finished bore. It is of course possible to provide a number of measuring nozzles over the periphery of the tool, said nozzles being designed in the same way as has been explained with reference to FIGS. 13 to 15. The measuring nozzles can be arranged both distributed on the periphery and axially one behind another.

The nozzles can also be provided as simple outlet openings at a precise diameter of the tool. Finally, it is possible not only to perform the [lacuna] the finished bore via the air gap s but also to provide direct contact between the measuring device and the workpiece 127. In this case, the measuring device 125 is of course designed in such a way that it does not damage the wall of the bore.

The centrifugal force-controlled rocker 130 has a number of functions. During the machining of the workpiece, it closes the measuring nozzle 126, so that dirt, coolant and the like cannot get to the measuring nozzle. Furthermore, when the tool is stationary, it lifts off the measuring nozzle automatically, so that the measuring operation by means of the compressed air can be carried out immediately afterward. Although the measuring face 145 comes into contact with the wall 143 of the bore, for example in the case of a cutter fracture, it is not damaged, since the tool is stationary during the measuring operation.

What is claimed is:

1. A tool having:
  a base body;
  at least one cutter holder mounted on the base body such that the holder can be adjusted transversely with respect to the axis of the tool;
  a cutter carried by the holder;
  a control sleeve mounted in the base body such that the sleeve can be displaced axially by pressure force;
  a control chamfer provided on the control sleeve;
  a pressure piece resting on the cutter holder and the control chamfer for transversely adjusting the cutter holder in response to the axial displacement of the control sleeve; and
  at least one centrifugal force-actuated element that controls the movement of the cutter holder for readjusting the cutter, the element being mounted in the base body such that the element can be adjusted under centrifugal force at a rotational speed ($n_1$) which is lower than the working speed ($n_{work}$) of the tool.

2. The tool as claimed in claim 1, wherein the centrifugal force-actuated element initiates a specific rotation of a screw element relative to a control rod, on which the control sleeve is mounted.

3. The tool as claimed in claim 2, wherein the screw element and the control rod are connected to each other by screw threads.

4. The tool as claimed in claim 2, wherein the screw element is located coaxially with the control rod.

5. The tool as claimed in claim 2, wherein the screw element can be rotated about its axis by the centrifugal force-actuated element.

6. The tool as claimed in claim 1, wherein the centrifugal force-actuated element can be adjusted radially outward by centrifugal force.

7. The tool as claimed in claim 2, wherein the centrifugal force-actuated element has toothing which engages with toothing on the periphery of the screw element.

8. The tool as claimed in claim 2, wherein rotation of the screw element relative to the control rod, the axial distance between the control chamfer and a stop fixed to the tool.

9. The tool as claimed in claim 2, wherein the screw element is a threaded spindle.

10. The tool as claimed in claim 1, wherein the control sleeve is secured against rotation.

11. The tool as claimed in claim 10, the control sleeve has at least one groove dimensioned to receive a locking element.

12. The tool as claimed in claim 2, wherein the screw element is secured against rotation relative to the base body during the machining of a workpiece.

13. The tool as claimed in claim 1, wherein a supply of pressure medium to the tool is controlled by centrifugal force.

14. The tool as claimed in claim 1, wherein the centrifugal force-actuated element is a first centrifugal force-actuated element, and a pressure medium bore within the tool can be closed or opened by a second centrifugal force-actuated element.

15. The tool as claimed in claim 14, wherein the second centrifugal force actuated element alternately opens and closes a coolant bore within the tool and the pressure medium bore.

16. The tool as claimed in claim 14, wherein the second centrifugal force-actuated element is adjusted under centrifugal force at a speed ($n_3$) which lies between the speed ($n_1$) for adjusting the first centrifugal force-actuated element and the working speed ($n_{work}$).

17. The tool as claimed in claim 16, further comprising a centrifugal force-controlled adjusting element on the base body which locks the sleeve in a desired axial location and is adjustable at a speed ($n_2$) which lies between the speed ($n_1$) for actuating the first centrifugal force-actuated element and the speed ($n_3$) for adjusting the centrifugal force-actuated element.

18. The tool as claimed in claim 17, wherein the centrifugal force-controlled adjusting element is accommodated in a radial holder in the base body.

19. The tool as claimed in claim 1, wherein the screw element has ratchet toothing, in which at least one latching pin engages.

20. The tool as claimed in claim 5, wherein the screw element projects into an adjusting element, the adjusting element being axially displaceable at a pressure force higher than the pressure force for axially displacing the control sleeve.

21. The tool as claimed in claim 20, wherein the screw element and the adjusting element are positively connected to each other in the direction of rotation.

22. The tool as claimed in claim 20, wherein the screw element and the adjusting element are adjustable axially relative to each other.

23. The tool as claimed in claim 20, wherein the adjusting element is enclosed by a ratchet wheel.

24. The tool as claimed in claim 23, wherein the ratchet wheel and the adjusting element are connected to each other by a device for converting longitudinal movement into rotary movement.

25. The tool as claimed in claim 23, wherein the periphery of the ratchet wheel is provided with ratchet toothing, in which at least one latching pin engages.

26. The tool as claimed in claim 25, wherein the ratchet wheel and the screw element rotate in opposite directions.

27. The tool as claimed in claim 25, the ratchet wheel and the screw element are connected by a freewheel clutch.

28. The tool as claimed in claim 1, wherein the tool has at least one measuring device for measuring a finished bore.

29. The tool as claimed in claim 28, wherein the measuring device has at least one measuring nozzle, which is connected to a compressed air source.

30. The tool as claimed in claim 29, wherein the measuring nozzle projects into a mounting space of a centrifugal force-controlled rocker on the base body.

31. The tool as claimed in claim 30, wherein, at the working speed ($n_{work}$) of the tool, the centrifugal force-controlled rocker closes the measuring nozzle.

32. The tool as claimed in claim 30, wherein the centrifugal force-controlled rocker is provided with a setting element for setting a measuring gap between a face of the rocker and a wall of a bore to be measured.

33. The tool as claimed in claim 1, wherein the tool is equipped with engagement means for a tool gripper for automatic tool changing.

34. A method of machining bores with a tool as claimed in claim 1, wherein a cylinder bore is produced under track control in at least two NC axes.

35. The method as claimed in claim 34, wherein the cylinder bore is produced under track control in three NC axes.

36. The method as claimed in claim 34, wherein directly adjacent bores on a workpiece are machined using multiple spindles.

37. The method as claimed in claim 34, wherein, at the end of machining, the tool assumes a specific rotary position such that a radius of the tool cutter lies in the direction of one NC axis, and the cutter is lifted off a wall of the bore by being moved in this axis.

38. The tool as claimed in claim 1, wherein the cutter holder is a rocker-type cutter holder.

39. A tool comprising:
   a base body;
   a cutter holder mounted on the base body and transversely adjustable with respect to an axis of the tool; and
   a first centrifugal force-actuated element mounted in the base body and adjustable under centrifugal force at a rotation speed ($n_1$) which is lower than a working speed ($n_{work}$) and operable to control movement of the cutter holder for readjusting the cutter.

40. The tool according to claim 39, further comprising:
   a control sleeve mounted in the base body such that it can be displaced axially in response to the centrifugal force;
   a control chamfer provided on the control sleeve; and
   a pressure piece operably connected to the control chamber and the cutter bolder for transversely adjusting the cutter holder.

41. The tool according to claim 39, further comprising a cutter carried by the cutter holder.

42. The tool according to claim 40, further comprising:
   an axially displaceable control rod upon which the control sleeve is mounted; and
   a screw element operably connecting the control rod and the first centrifugal force-actuated element, wherein rotation of the first centrifugal force-actuated element initiates rotation of the screw element.

43. The tool according to claim 39, wherein the first centrifugal force-actuated element is radially outwardly adjustable.

44. The tool according to claim 42, wherein the screw element is operable to control axial displacement of the control chamfer.

45. The tool according to claim 40, wherein the control sleeve is secured against rotation.

46. The tool according to claim 42, wherein the screw element is secured against rotation relative to the base body during the machining of a workpiece.

47. The tool according to claim 40, wherein the axial displacement of the control sleeve is controlled by a pressure medium supplied to the tool.

48. The tool according to claim 47, further comprising a pressure medium bore within the tool that supplies the pressure medium.

49. The tool according to claim 48, further comprising a second centrifugal force-actuated element mounted in the base body for opening and closing the pressure medium bore.

50. The tool according to claim 49, wherein the second centrfigal force-actuated element is adjustable at a rotation speed ($n_3$) which lies between the speed ($n_1$) for adjusting the first centrifugal force-actuated element and the working speed ($n_{work}$).

51. The tool according to claim 50, further comprising:
   a centrifugal force-controlled adjusting element mounted in the base body and operable to lock the sleeve in a desired axial location; and
   wherein the centrifugal force controlled adjusting element is adjustable at a speed ($n_2$) which lies between the speed ($n_1$) for actuating the first centrifugal force-actuated element and the speed ($n_3$) for adjusting the second centrifugal force-actuated element.

52. The tool according to claim 39, wherein the tool includes at least one measuring device for measuring a finished bore.

53. The tool according to claim 52, wherein the measuring device includes at least one measuring nozzle which is connected to a compressed air source.

54. The tool according to claim 53, wherein the measuring nozzle is provided in a centrifugal force-controlled rocker on the base body.

55. The tool according to claim 54, wherein the centrifugal force-controlled rocker is operable to close the measuring nozzle at the working speed ($n_{work}$) of the tool.

56. The tool according to claim 54, wherein the centrifugal force-controlled rocker is provided with a setting element which sets a measuring gap between the a face of the rocker and a wall of a bore to be measured.

* * * * *